US010235171B2

(12) United States Patent
Ostanevich et al.

(10) Patent No.: US 10,235,171 B2
(45) Date of Patent: Mar. 19, 2019

(54) METHOD AND APPARATUS TO EFFICIENTLY HANDLE ALLOCATION OF MEMORY ORDERING BUFFERS IN A MULTI-STRAND OUT-OF-ORDER LOOP PROCESSOR

(71) Applicant: Intel Corporation, Santa Clara, CA (US)

(72) Inventors: Alexander Y. Ostanevich, Moscow (RU); Jayesh Iyer, Santa Clara, CA (US); Sergey P. Scherbinin, Obninsk (RU); Dmitry M. Maslennikov, Moscow (RU); Denis G. Motin, Moscow (RU); Alexander V. Ermolovich, Moscow (RU); Andrey Chudnovets, Moscow (RU); Sergey A. Rozhkov, San Jose, CA (US); Boris A. Babayan, Moscow (RU)

(73) Assignee: INTEL CORPORATION, Santa Clara, CA (US)

(*) Notice: Subject to any disclaimer, the term of this patent is extended or adjusted under 35 U.S.C. 154(b) by 251 days.

(21) Appl. No.: 15/391,791

(22) Filed: Dec. 27, 2016

(65) Prior Publication Data
US 2018/0181397 A1 Jun. 28, 2018

(51) Int. Cl.
G06F 9/38 (2018.01)
G06F 9/30 (2018.01)

(52) U.S. Cl.
CPC ........ G06F 9/30043 (2013.01); G06F 9/3005 (2013.01); G06F 9/30021 (2013.01); G06F 9/30072 (2013.01); G06F 9/3851 (2013.01)

(58) Field of Classification Search
CPC .................. G06F 9/3851; G06F 9/30021
USPC .................................... 712/216, 219
See application file for complete search history.

(56) References Cited

U.S. PATENT DOCUMENTS

| 7,366,878 | B1* | 4/2008 | Mills ............. G06F 9/3838 712/214 |
| 9,798,549 | B1* | 10/2017 | Boersma ........ G06F 9/3855 |
| 2008/0250233 | A1* | 10/2008 | Marden .......... G06F 9/3851 712/228 |
| 2010/0262967 | A1* | 10/2010 | Eisen ............ G06F 9/485 718/102 |
| 2010/0274972 | A1 | 10/2010 | Babayan et al. |

(Continued)

FOREIGN PATENT DOCUMENTS

WO 2015097494 A1 7/2015

OTHER PUBLICATIONS

Raman, et al., "Parallel-Stage Decoupled Software Pipelining," ACM, CGO'08, Apr. 5-10, 2008, 10 pages.

Primary Examiner — Yuqing Xiao
(74) Attorney, Agent, or Firm — NDWE, LLP

(57) ABSTRACT

An apparatus includes a first circuit to determine a real program order (RPO) of an eldest undispatched instruction from among a plurality of strands, a second circuit to determine an RPO limit based on a delta value and the RPO of the eldest undispatched instruction, an ordering buffer to store entries for instructions that are waiting to be retired, and a third circuit to execute an orderable instruction from a strand from the plurality of strands to cause an entry for the orderable instruction to be inserted into the ordering buffer in response to a determination that an RPO of the orderable instruction is less than or equal to the RPO limit.

20 Claims, 19 Drawing Sheets

(56) References Cited

U.S. PATENT DOCUMENTS

| | | | |
|---|---|---|---|
| 2010/0299508 A1* | 11/2010 | Luttrell | G06F 9/3824 712/234 |
| 2013/0290675 A1* | 10/2013 | Chou | G06F 9/30043 712/205 |
| 2013/0339711 A1 | 12/2013 | Kosarev et al. | |
| 2015/0301831 A1 | 10/2015 | Iyer et al. | |

* cited by examiner

ORIGINAL INSTRUCTION STREAM 300
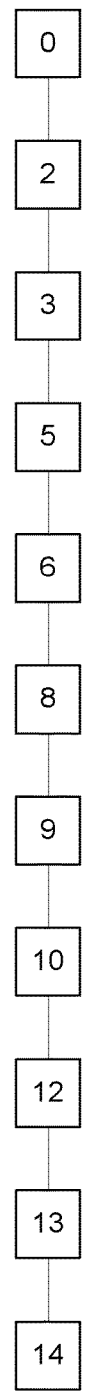
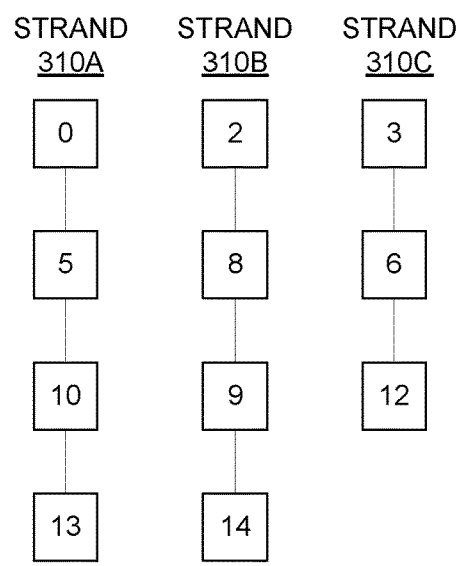
FIG. 3B
FIG. 3A

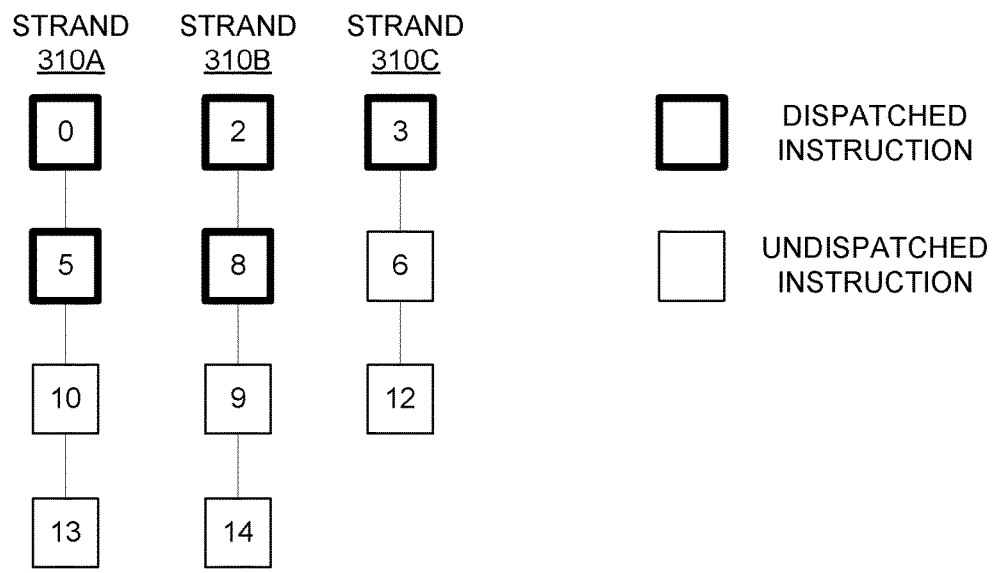
FIG. 4
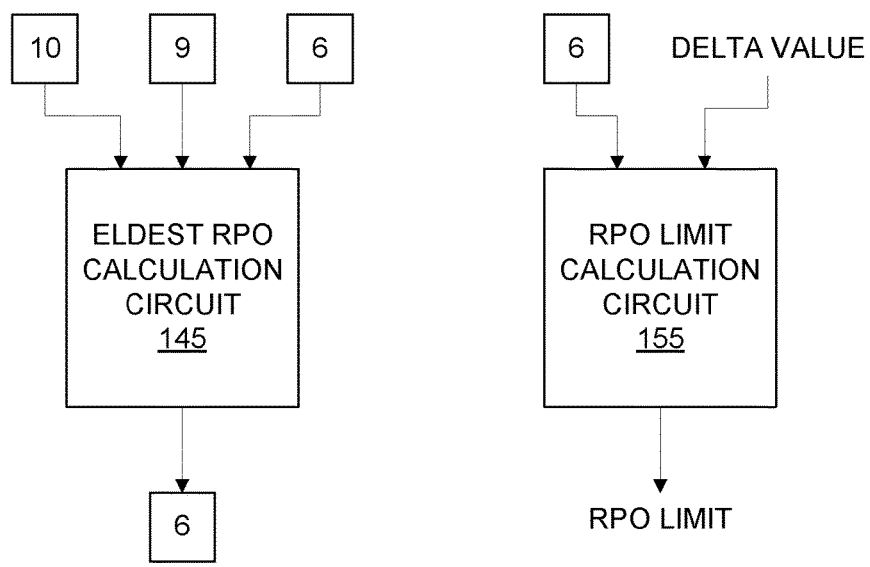
FIG. 5  FIG. 6

ELDEST RPO (6) + DELTA VALUE (5) = RPO LIMIT (11)

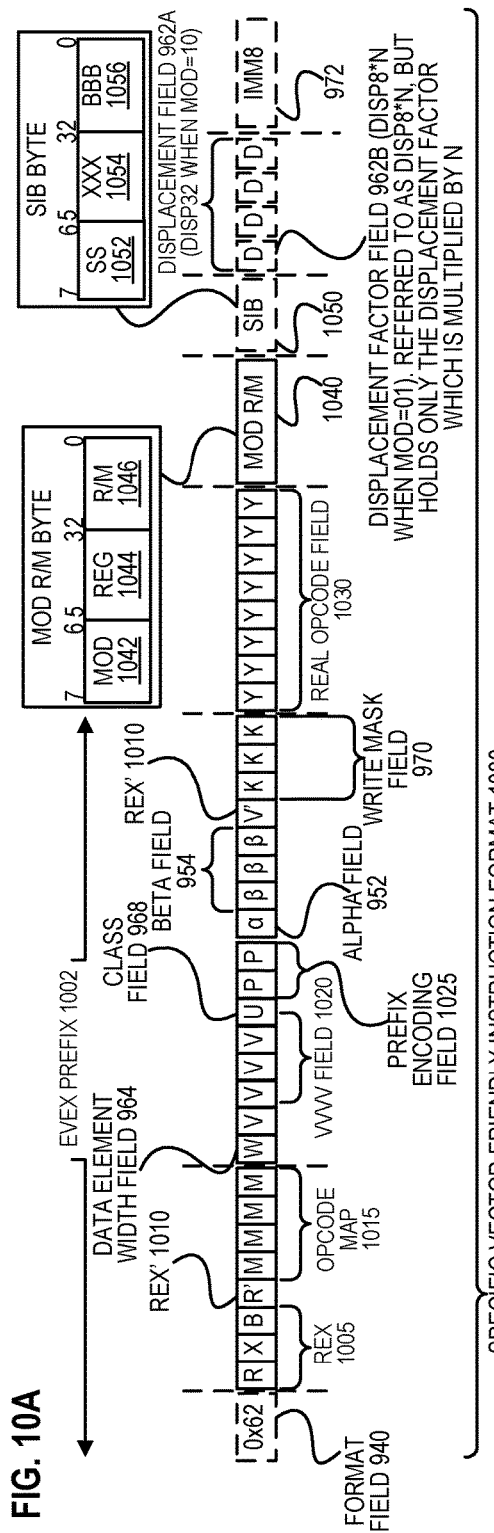
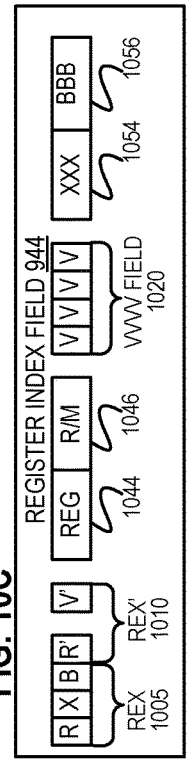
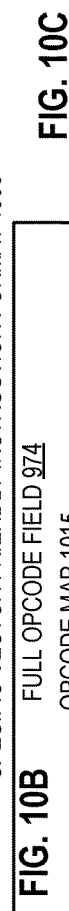
FIG. 10A
FIG. 10B
FIG. 10C

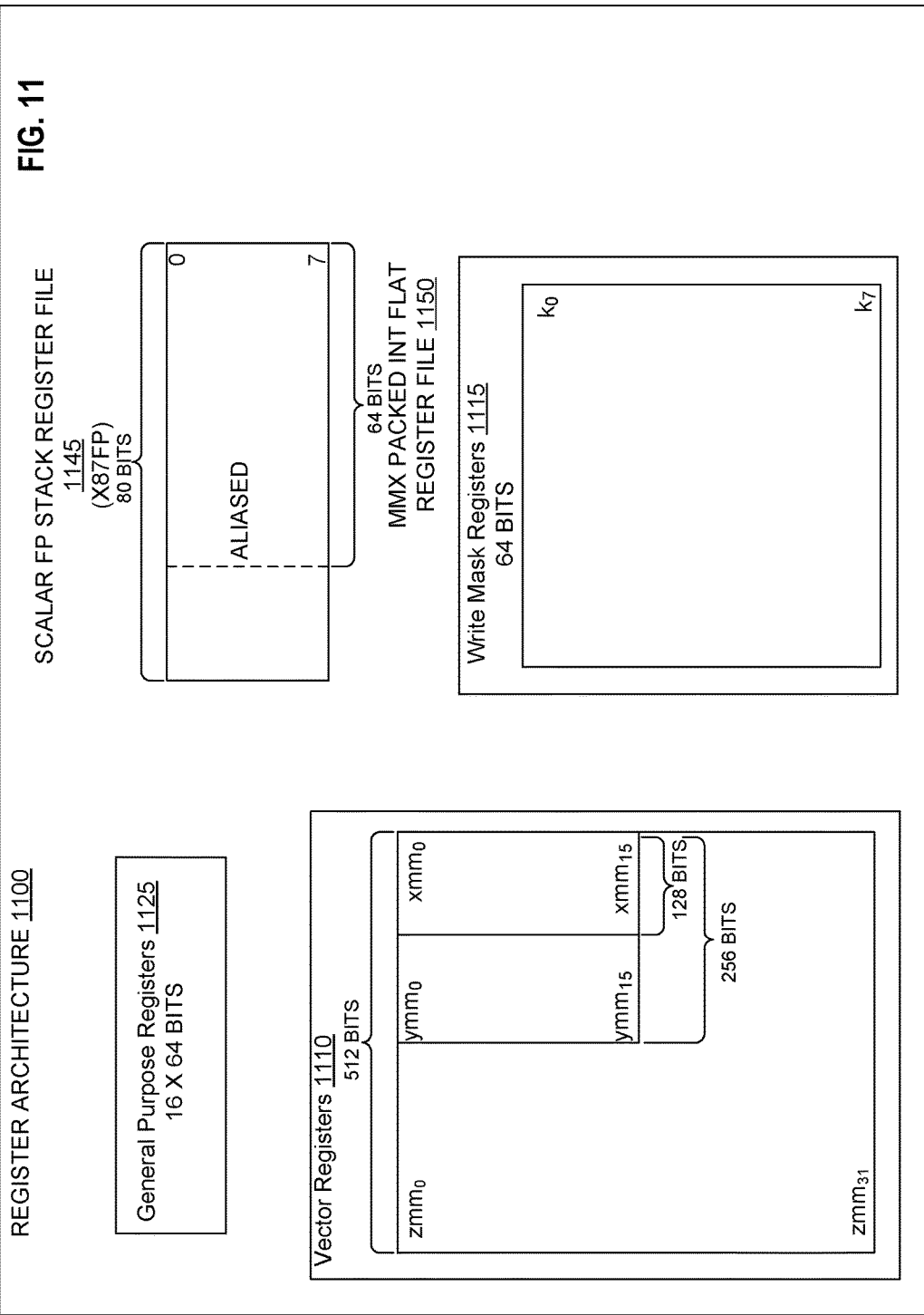

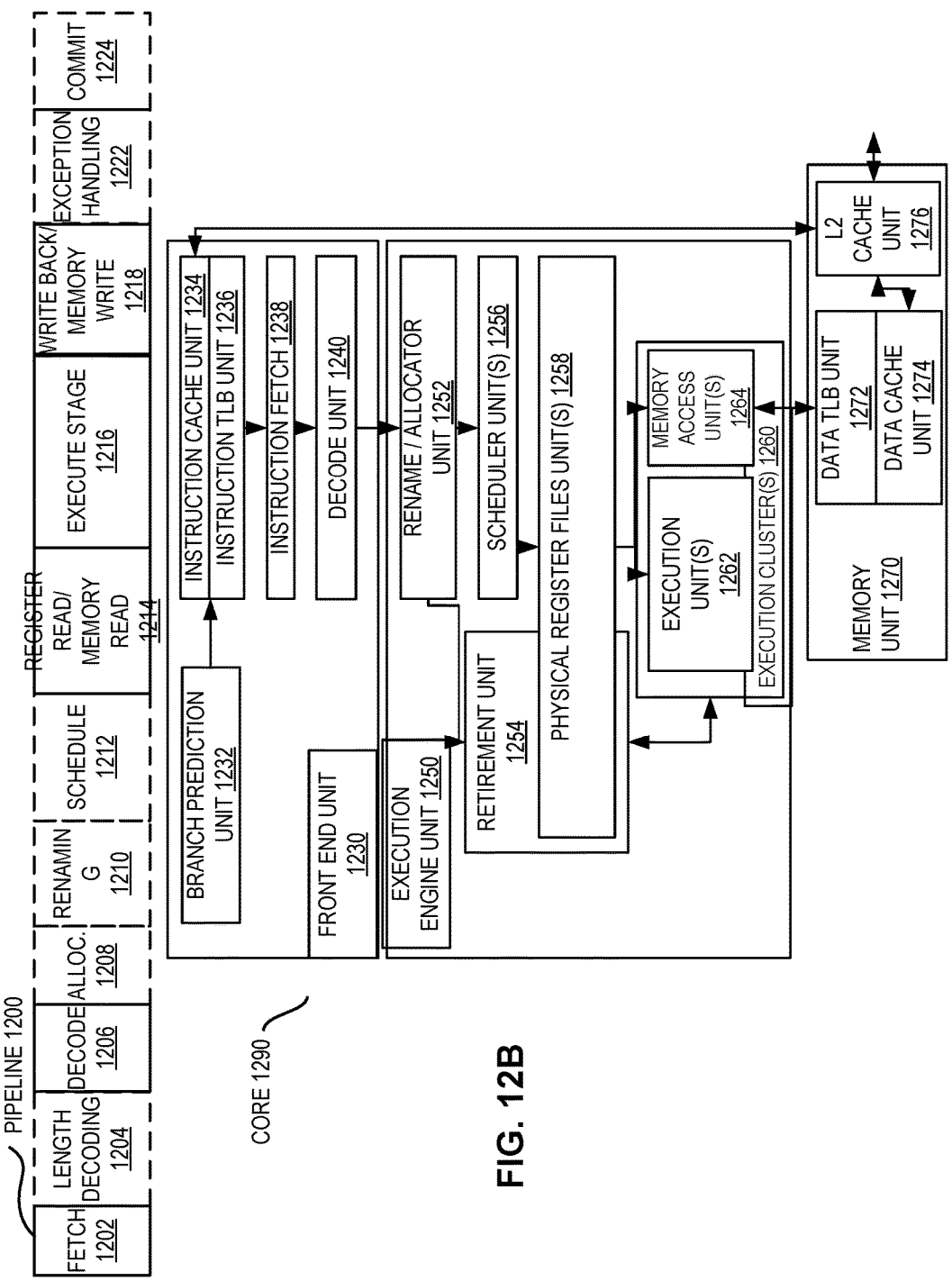

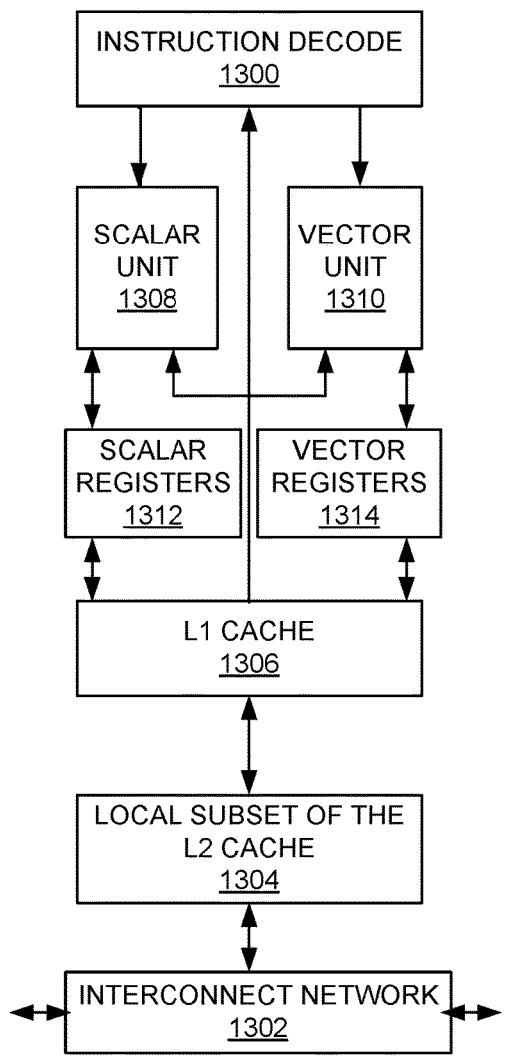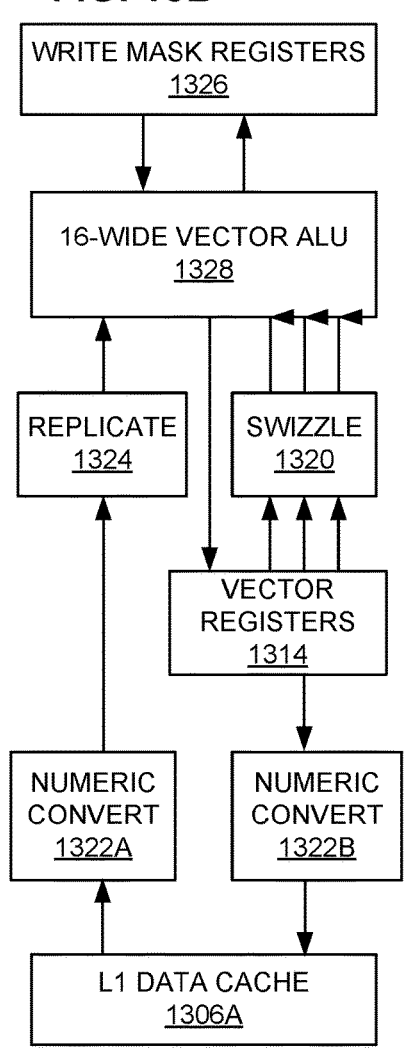

METHOD AND APPARATUS TO EFFICIENTLY HANDLE ALLOCATION OF MEMORY ORDERING BUFFERS IN A MULTI-STRAND OUT-OF-ORDER LOOP PROCESSOR

TECHNICAL FIELD

Embodiments of the invention relate to the field of computing; and more specifically, to efficiently utilizing an ordering buffer to improve the performance of a multi-strand out-of-order loop processor.

BACKGROUND

A multi-strand out-of-order loop processor is an accelerator that is able to process multiple strands or micro-threads in parallel such that: (1) instructions of a strand or micro-thread may be fetched, issued, and executed out of program order with respect to instructions of different strands or micro-threads and (2) all but memory and interruptible instructions may be retired (committed) out of program order. A strand or micro-thread is a sequence of instructions arranged by a binary translator (e.g., at program compilation time for the hot loops identified), where instructions belonging to the same strand or micro-thread are to be executed by hardware in-order.

In a multi-strand out-of-order loop processor, orderable instructions (e.g., instructions that access memory or interruptible instructions) may be executed out of program order. However, orderable instructions are retired (committed) in program order to ensure that the side-effects of the orderable instructions (e.g., memory state changes, interrupts, and faults) appear in program order, as encoded in the original instruction flow. An architecture that employs a multi-strand out-of-order loop processor may utilize dedicated resources such as an ordering buffer to ensure that orderable instructions are retired in program order. The ordering buffer stores entries for orderable instructions to preserve the results of the orderable instructions until the orderable instructions are ready to be retired. Entries for orderable instructions are inserted into the ordering buffer as they are executed (e.g., potentially out of program order). However, entries are processed out of the ordering buffer for retirement in program order. The side-effects of the orderable instructions are disclosed at retirement stage.

When the ordering buffer has enough space, several strands that are being processed in parallel may insert entries into the ordering buffer, and thus make progress concurrently. This is beneficial for overall performance since it allows for parallel execution. However, when the ordering buffer is oversubscribed, strands that have an orderable instruction ready for execution are penalized. Progress of such strands can become serial instead of concurrent for a period of time (e.g., only one orderable instruction can be executed at a time until space becomes available in the ordering buffer). The problem is exacerbated when the ordering buffer is oversubscribed with young orderable instructions since this prevents entries for elder orderable instructions (which need to be retired before younger orderable instructions) from being inserted into the ordering buffer, which results in starvation of the multi-strand out-of-order loop processor for some time.

BRIEF DESCRIPTION OF THE DRAWINGS

The invention may best be understood by referring to the following description and accompanying drawings that are used to illustrate embodiments of the invention. In the drawings:

FIG. 3A is a diagram illustrating an original instruction stream, according to some embodiments;

FIG. 3B is a diagram illustrating an instruction stream that is organized into multiple strands, according to some embodiments;

FIG. 4 is a diagram illustrating the state of the strands during a particular point of execution, according to some embodiments;

FIG. 5 is a diagram illustrating exemplary inputs and outputs of an eldest RPO calculation circuit, according to some embodiments;

FIG. 6 is a diagram illustrating exemplary inputs and outputs of an RPO limit calculation circuit, according to some embodiments;

FIG. 9A is a block diagram illustrating a generic vector friendly instruction format and class A instruction templates thereof according to embodiments of the invention;

FIG. 9B is a block diagram illustrating the generic vector friendly instruction format and class B instruction templates thereof according to embodiments of the invention;

FIG. 10A is a block diagram illustrating an exemplary specific vector friendly instruction format according to embodiments of the invention;

FIG. 10B is a block diagram illustrating the fields of the specific vector friendly instruction format 1000 that make up the full opcode field 974 according to one embodiment of the invention;

FIG. 10C is a block diagram illustrating the fields of the specific vector friendly instruction format 1000 that make up the register index field 944 according to one embodiment of the invention;

FIG. 11 is a block diagram of a register architecture 1100 according to one embodiment of the invention;

FIG. 12A is a block diagram illustrating both an exemplary in-order pipeline and an exemplary register renaming, out-of-order issue/execution pipeline according to embodiments of the invention;

FIG. 12B is a block diagram illustrating both an exemplary embodiment of an in-order architecture core and an exemplary register renaming, out-of-order issue/execution architecture core to be included in a processor according to embodiments of the invention;

FIGS. 13A-B illustrate a block diagram of a more specific exemplary in-order core architecture, which core would be one of several logic blocks (including other cores of the same type and/or different types) in a chip;

FIG. 13A is a block diagram of a single processor core, along with its connection to the on-die interconnect network 1302 and with its local subset of the Level 2 (L2) cache 1304, according to embodiments of the invention;

FIG. 13B is an expanded view of part of the processor core in FIG. 13A according to embodiments of the invention;

FIG. 15 shown a block diagram of a system in accordance with one embodiment of the present invention;

FIG. 16 is a block diagram of a first more specific exemplary system in accordance with an embodiment of the present invention;

FIG. 17 is a block diagram of a second more specific exemplary system in accordance with an embodiment of the present invention;

FIG. 18 is a block diagram of a SoC in accordance with an embodiment of the present invention.

DETAILED DESCRIPTION

Figure 1:
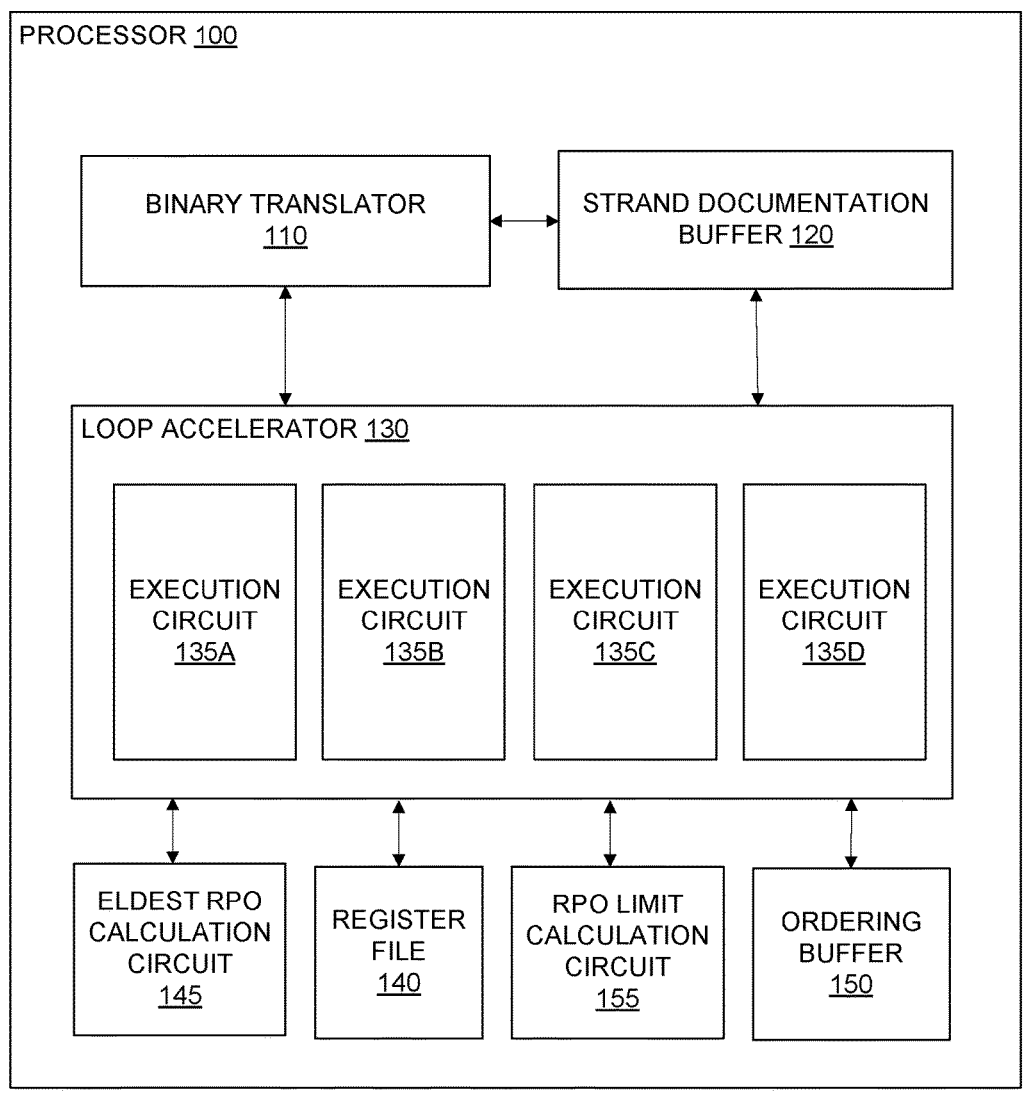
FIG. 1 is a diagram illustrating a processor that employs a highly parallel strand-based architecture, according to some embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, a strand or micro-thread is a sequence of instructions arranged by a binary translator (e.g., at program compilation time for the hot loops identified), where instructions belonging to the same strand or micro-thread are to be executed by hardware in-order.

As used herein, a multi-strand out-of-order loop processor (sometimes referred to herein simply as a multi-strand loop processor or loop accelerator) is an accelerator that processes multiple strands or micro-threads created by a binary translator in parallel such that: (1) instructions of a strand or micro-thread may be fetched, issued, and executed out of program order with respect to instructions of different strands or micro-threads and (2) all but memory and interruptible instructions may be retired (committed) out of program order.

As previously mentioned, an architecture that employs a multi-strand out-of-order loop processor may utilize dedicated resources such as an ordering buffer to ensure that orderable instructions are retired in program order. This ensures that the side-effects of the orderable instructions (e.g., memory state changes, interrupts, and faults) appear in program order, as encoded in the original instruction flow. Entries for orderable instructions are inserted into the ordering buffer as they are executed (e.g., potentially out of program order). However, entries are processed out of the ordering buffer for retirement in program order. The side-effects of the orderable instructions are disclosed at retirement stage. As used herein, an orderable instruction is an instruction that is to be retired in program order (e.g., memory access instructions and interruptible instructions).

When the ordering buffer has enough space, several strands that are being processed in parallel may insert entries into the ordering buffer, and thus make progress concurrently. This is beneficial for overall performance since it allows for parallel execution. However, when the ordering buffer is oversubscribed, strands that have an orderable instruction ready for execution are penalized. Progress of such strands can become serial instead of concurrent for a period of time (e.g., only one orderable instruction can be executed at a time until space becomes available in the ordering buffer). The problem is exacerbated when the ordering buffer is oversubscribed with young orderable instructions since this prevents entries for elder orderable instructions (which need to be retired before younger orderable instructions) from being inserted into the ordering buffer, which results in starvation of the multi-strand out-of-order loop processor for some time.

Embodiments disclosed herein provide a technique for prioritizing elder orderable instructions over younger orderable instructions in a multi-strand out-of-order loop processor. According to some embodiments, an eldest real program order (RPO) calculation circuit determines an RPO of an eldest undispatched instruction from among a plurality of strands and stores the RPO of the eldest undispatched instruction in a register. An RPO limit calculation circuit determines an RPO limit based on adding a delta value to the RPO of the eldest undispatched instruction (e.g., stored in the register). An execution circuit executes an orderable instruction from a strand from the plurality of strands to cause an entry for the orderable instruction to be inserted into the ordering buffer in response to a determination that an RPO of the orderable instruction is less than or equal to the RPO limit. However, if the RPO of the orderable instruction is larger than the RPO limit, the execution circuit stalls processing of the strand (and an entry for the orderable instruction is not inserted into the ordering buffer). In this way, entries for elder orderable instructions (e.g., orderable instructions that have RPO less than or equal to the RPO limit) are allowed to be inserted into the ordering buffer, while entries for younger orderable instructions (e.g., orderable instructions that have RPO that is larger than the RPO limit) are not allowed to be inserted into the ordering buffer.

This technique serves to give priority to elder orderable instructions over younger orderable instructions.

An advantage of embodiments disclosed herein is that they help prevent the ordering buffer from being oversubscribed with younger orderable instructions so as not to impede the progress of elder orderable instructions. This allows for more opportunities for parallel execution, which improves performance. Other advantages will be apparent to one having ordinary skill in the art from the disclosure provided herein.

FIG. 1 is a diagram illustrating a processor that employs a highly parallel strand-based architecture, according to some embodiments. As shown in the diagram, the processor 100 includes a binary translator 110, a strand documentation buffer 120, a loop accelerator 130, an eldest RPO calculation circuit 145, a register file 140, an RPO limit calculation circuit 155, and an ordering buffer 150. The binary translator 110 translates program code (e.g., x86 binary) into code that can be run on the loop accelerator 130. The binary translator 110 may perform static analysis of the program code to identify any loops in the program code. Based on this static analysis, the binary translator 110 may decompose the loops in the program code into one or more strands. A strand (which may also be referred to as a micro-thread) is a sequence of instructions arranged by the binary translator 110, where instructions belonging to the same strand are to be executed by hardware (e.g., loop accelerator 130) in-order. As will be described in additional detail below, multiple strands can be executed in parallel by the loop accelerator 130 to accelerate loop execution, where instructions from different strands may be executed out-of-order. The binary translator 110 may create strands based on the characteristics of the loops in the program code. For example, the binary translator 110 may create strands such that dependent instructions (e.g., dependent on register or memory) are placed in the same strand as other instructions they depend upon, while independent instructions are placed in separate strand. This allows the strand with the independent instructions to make progress even if the strand with the dependent instructions is stalled (e.g., because it is waiting for a memory access operation to complete).

In one embodiment, the binary translator 110 is communicatively coupled to a strand documentation buffer 120 that stores strand documentation. In one embodiment, the strand documentation buffer 120 stores strand documentation for each strand (per strand) that is being processed by the loop accelerator 130. The strand documentation for a strand includes information regarding the properties of the strand. Although the strand documentation buffer 120 is describe above as being a single buffer that includes strand documentation for all strands, it should be understood that other embodiments may provide a separate strand documentation buffer 120 (hardware buffer) per strand that is to store strand documentation for the corresponding strand. In one embodiment, the strand documentation for a strand includes an indication of an instruction pointer for the strand. The instruction pointer for a strand indicates the current instruction being executed by the strand (or the next instruction to be executed by the strand, depending on implementation). The strand-based architecture thus employs multiple instruction pointers (one per strand), which is in contrast to a typical superscalar processor that only employs a single instruction pointer. In one embodiment, the strand documentation for a strand includes an indication of an iteration number for the strand. The iteration number for the strand indicates the current loop iteration that is being executed by the strand. In one embodiment, the strand documentation for a strand includes an indication of a loop exit counter for the strand. The loop exit counter for the strand allows detection of a counted exit. In one embodiment, the strand documentation for a strand includes an indication of a register base for the strand. The register base for the strand indicates the set of registers that the strand can work with for the current loop iteration being executed by the strand. The strand documentation 125 for a strand may thus contain information that defines the current state of execution of the strand (e.g., which instruction is being executed, which iteration within the loop is being executed, and which registers the strand can work with). As such, different strands can execute the same program code (e.g., code within a loop body) in parallel, but for different loop iterations, depending on the contents of the strand documentation.

The binary translator 110 is communicatively coupled to the loop accelerator 130 and may provide strands to the loop accelerator 130 for execution. The loop accelerator 130 is a hardware component that is dedicated for accelerating loop execution. The loop accelerator 130 includes multiple execution circuits (execution circuits 135A-D) to process multiple strands in parallel. As shown in the diagram, the loop accelerator 130 includes four execution circuits 135. As such, this loop accelerator 130 is able to process four strands in parallel. However, it should be understood that the loop accelerator 130 can include more or less execution circuits 135 than shown in the diagram. The loop accelerator 130 executes instructions belonging to the same strand sequentially (in-order). However, the loop accelerator 130 may execute instructions belonging to different strands non-sequentially (out-of-order) as long as there are no dependencies between them that prevent such parallelization. The loop accelerator 130 is communicatively coupled to the strand documentation buffer 120. The loop accelerator 130 may access and update strand documentation stored in the strand documentation buffer 120 when processing a strand (e.g., to update the current state of execution of the strand). The loop accelerator 130 is also communicatively coupled to a register file 140 that includes multiple registers. The loop accelerator 130 (and more specifically, the execution circuits 135 of the loop accelerator 130) may work with the registers of the register file 140 when executing instructions. The loop accelerator 130 is also communicatively coupled to an ordering buffer 150. As will be described in further detail herein below, the ordering buffer 150 stores entries for orderable instructions to preserve the results of the orderable instructions until the orderable instructions are ready to be retired. The loop accelerator 130 is also communicatively coupled to an eldest RPO calculation circuit 145 and an RPO limit calculation circuit 155. As will be described in further detail herein below, the loop accelerator 130 utilizes the calculation results of the eldest RPO calculation circuit 145 and the RPO limit calculation circuit 155 to determine whether an entry for an orderable instruction can be inserted into the ordering buffer 150.

As previously mentioned, the loop accelerator 130 may execute instructions from different strands out-of-order. Although instructions may be executed out-of-order, the side effects (e.g., memory state changes, interrupts, and faults) should appear in-order, as encoded in the original instruction flow. In one embodiment, the binary translator 110 assigns a sequence number, referred to herein as a real program order (RPO), to the instructions or a subset of the instructions to be executed by the loop accelerator 130 (e.g., just the orderable instructions such as memory access instructions and interruptible instructions). The RPO may be a natural number that is assigned to instructions (e.g., orderable instructions) in progressive order, but need not be consecutive. In one embodiment, RPO values increase as instructions become younger (they appear later in the code sequence). Stated differently, elder instructions are assigned a smaller RPO relative to younger instructions. The assignment of RPOs preserves information about the original program order, which allows the loop accelerator 130 to properly retire orderable instructions in original program order (to ensure that the side effects appear in-order). In one embodiment, the RPO of an instruction (or a value from which the RPO can be determined) is encoded in the instruction itself (e.g., by the binary translator 110). For purposes of illustration, unless stated otherwise, embodiments will be described in a context where elder instructions are assigned lower RPO compared to younger instructions. It should be understood, however, that other embodiments may utilize a different convention.

Each instruction is processed by the loop accelerator 130 through several pipeline stages. For sake of illustration and simplicity, the stages can be narrowed down to decode stage, read stage, execute stage, write-back stage, and retire stage. Instructions can be largely divided into two categories: orderable instructions (e.g., memory access instructions and interruptible instructions) and non-orderable instructions (e.g., integer arithmetic instructions, logical instructions, and branch instructions). Load instructions, store instructions, and interruptible instructions are examples of orderable instructions. In one embodiment, when an orderable instruction is executed, an entry for the orderable instruction is inserted into the ordering buffer 150. In one embodiment, the entry for the orderable instruction includes the RPO of the orderable instruction and an execution result of the orderable instruction (e.g., which may be an actual value or an exception). This entry serves to preserve the execution result of the orderable instruction until in-order retirement comes. Entries for orderable instructions may be inserted into the ordering buffer 150 out of RPO order. However, entries are processed out of the ordering buffer 150 (for retirement of the corresponding orderable instruction) in RPO order.

As previously mentioned, when the ordering buffer 150 has enough space, several strands that are being processed in parallel may insert entries into the ordering buffer 150, and thus make progress concurrently. This is beneficial for overall performance since it allows for parallel execution. However, when the ordering buffer 150 is oversubscribed, strands that have an orderable instruction ready for execution are penalized. Progress of such strands can become serial instead of concurrent for a period of time (e.g., only one orderable instruction can be executed at a time until space becomes available in the ordering buffer 150). The problem is exacerbated when the ordering buffer 150 is oversubscribed with young orderable instructions since this prevents entries for elder orderable instructions (which need to be retired before younger orderable instructions) from being inserted into the ordering buffer 150, which results in starvation of the loop accelerator 130 for some time.

In one embodiment, elder orderable instructions are prioritized over younger orderable instructions to prevent starvation, as described herein. In one embodiment, the eldest RPO calculation circuit 145 determines the RPO of the eldest undispatched (orderable) instruction from among a plurality of strands (currently being processed) and stores the RPO of the eldest undispatched instruction in a register. The register in which the RPO of the eldest undispatched instruction is stored may be referred to herein as the executed instruction pointer (EIP) register.

In one embodiment, the strand documentation for each strand includes an indication of the RPO of the eldest undispatched orderable instruction within that strand. This RPO is referred to as the RPO of that strand. In one embodiment, the binary translator 110 encodes some information in the instructions within a strand that allow hardware to determine the RPO of the next orderable instruction within the strand (e.g., the difference between the RPO of the current orderable instruction and the RPO of the next orderable instruction). This allows hardware to determine the eldest undispatched instruction within that particular strand and store it in the strand documentation for the strand. In one embodiment, the eldest RPO calculation circuit 145 determines the RPO of the eldest undispatched instruction from among the plurality of strands based on comparing the RPOs of the strands. For example, the eldest RPO calculation circuit 145 may obtain the RPOs of each of the strands from corresponding strand documentation (in strand documentation buffer 120) and compare the RPOs of the strands to determine the lowest RPO among the RPOs of the strands. This RPO corresponds to the RPO of the eldest undispatched instruction from among the plurality of strands.

The RPO limit calculation circuit 155 then determines an RPO limit based on adding a delta value to the RPO of the eldest undispatched instruction (e.g., which may be stored in the EIP register). In one embodiment, the delta value is provided by an instruction referred to herein as an execution RPO limit management (ERLM) instruction (e.g., delta value is encoded as a constant in the ERLM instruction). The binary translator 110 may have inserted the ERLM instruction in the code to set the delta value.

The loop accelerator 130 may then obtain an orderable instruction that is ready for execution from a strand from the plurality of strands. The loop accelerator 130 determines whether the RPO of this orderable instruction is less than or equal to the RPO limit (as determined by the RPO limit calculation circuit 155). If so, the loop accelerator 130 (and more specifically, an execution circuit 135 of the loop accelerator 130) executes the orderable instruction to cause an entry for the orderable instruction to be inserted into the ordering buffer 150. However, if the loop accelerator 130 determines that the RPO of the orderable instruction is larger than the RPO limit, the loop accelerator 130 stalls processing of the strand (and an entry for the orderable instruction is not inserted into the ordering buffer 150). The strand may be stalled until the RPO limit is updated to be equal to or larger than the RPO of the orderable instruction. For example, the RPO limit may subsequently be updated after the eldest undispatched instruction gets dispatched for execution, at which point a new instruction becomes the eldest undispatched instruction. This may cause the RPO limit to be updated.

In one embodiment, hardware (e.g., RPO limit calculation circuit 155) sets the delta value (e.g., at hardware restart) and adjusts the delta value based on an occupancy rate of the ordering buffer 150. For example, the RPO limit calculation circuit 155 may decrease the delta value if the occupancy rate of the ordering buffer 150 exceeds a predefined threshold rate for some period of time (which indicates that the ordering buffer 150 is oversubscribed). Correspondingly, the RPO limit calculation circuit 155 may increase the delta value if the occupancy rate of the ordering buffer 150 is below a predefined threshold rate for some period of time (which indicates that the ordering buffer 150 is undersubscribed). In one embodiment, the binary translator 110 initially sets the delta value (e.g., by generating and inserting an ERLM instruction that provides the delta value) and then hardware (e.g., RPO limit calculation circuit 155) adjusts the delta value based on the occupancy rate of the ordering buffer 150.

In one embodiment, the ordering buffer 150 includes a plurality of buffers. For example, the ordering buffer 150 may include a load buffer, a store buffer, and/or an interruptible instruction buffer for storing entries for load instructions, store instructions, and interruptible instructions, respectively. In one embodiment, the RPO limit calculation circuit 155 determines a separate RPO limit for each of the plurality of buffers. For example, the RPO limit calculation circuit 155 may determine a separate RPO limit for the load buffer, the store buffer, and the interruptible instruction buffer based on the respective occupancy rates of the buffers. The RPO limit for a particular buffer may be used to determine whether an entry can be inserted into that particular buffer.

In this way, entries for elder orderable instructions (e.g., orderable instructions that have RPO less than or equal to the RPO limit) are allowed to be inserted into the ordering buffer 150, while entries for younger orderable instructions (e.g., orderable instructions that have RPO that is larger than the RPO limit) are not allowed to be inserted into the ordering buffer 150. This technique has the effect of giving priority to elder orderable instructions over younger orderable instructions so as not to impede the progress of elder orderable instructions. This allows for more opportunities for parallel execution, which in turn improves performance.

Figure 2:
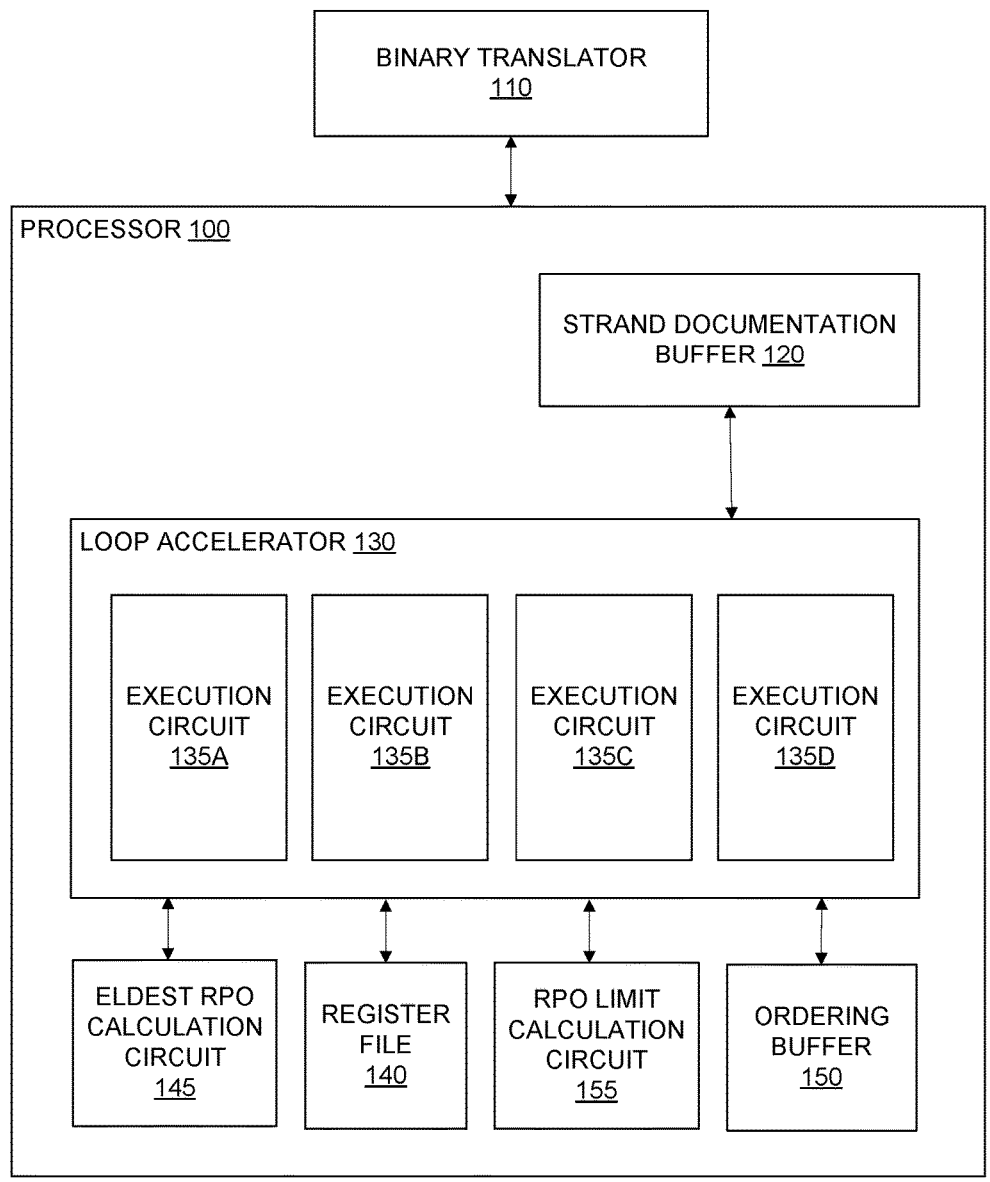
FIG. 2 is a diagram illustrating a system that employs a highly parallel strand-based architecture, according to some embodiments.

FIG. 2 is a diagram illustrating a system that employs a highly parallel strand-based architecture, according to some embodiments. The system has similar components as the processor 100 shown in FIG. 1, except that the binary translator 110 is implemented external to the processor 100 (e.g., as a software implementation). It should be understood that the arrangement of components shown in the diagrams is provided by way of example and not limitation. Different embodiments may employ a different arrangement of components than shown in the diagrams.

FIG. 3A is a diagram illustrating an original instruction stream, according to some embodiments. In the diagram, each instruction in the instruction stream 300 is represented as a box. The number provided within a box is the RPO of the instruction represented by that box. The instructions in the instruction stream 300 are arranged in RPO order. As shown in the diagram, the instruction stream 300 includes 11 instructions. The RPOs of these instructions are 1, 2, 3, 5, 6, 8, 9, 10, 12, 13, and 14, respectively. In one embodiment, the binary translator 110 organizes the instructions into multiple strands, as will be further described with reference to FIG. 3B.

FIG. 3B is a diagram illustrating an instruction stream that is organized into multiple strands, according to some embodiments. As shown in the diagram, the instruction stream 300 described above with reference to FIG. 3A is organized into three strands (strand 310A, strand 310B, and strand 310C). Strand 310A includes instructions having RPO 0, 5, 10, and 13. Strand 310B includes instructions having RPO 2, 8, 9, and 14. Strand 310C includes instructions having RPO 3, 6, and 12. In one embodiment, the binary translator 110 creates the strands 310 based on the original instruction stream 300. The strands 310 are organized such that instructions within the same strand 310 are to be executed in RPO order, while instructions from different strands 310 may be executed out of RPO order.

FIG. 4 is a diagram illustrating the state of the strands during a particular point of execution, according to some embodiments. As shown in the diagram, at this particular point of execution, the loop accelerator 130 has already dispatched the instructions having RPO 0 and 5 in strand 310A, the instructions having RPO 2 and 8 in strand 310B, and the instruction having RPO 3 in strand 310C. The instructions having RPO 10 and 13 in strand 310A, the instructions having RPO 9 and 14 in strand 310B, and the instructions having RPO 6 and 12 in strand 310C have not been dispatched yet (they are undispatched). The eldest undispatched instruction in strand 310A is the instruction having RPO 10. Thus, the RPO of strand 310A may be set to 10 (e.g., in strand documentation for strand 310A). The eldest undispatched instruction in strand 310B is the instruction having RPO 9. Thus, the RPO of strand 310B may be set to 9 (e.g., in strand documentation for strand 310B). The eldest undispatched instruction in strand 310C is the instruction having RPO 6. Thus, the RPO of strand 310C may be set to 6 (e.g., in strand documentation for strand 310C).

FIG. 5 is a diagram illustrating exemplary inputs and outputs of an eldest RPO calculation circuit, according to some embodiments. The eldest RPO calculation circuit 145 takes as input the RPOs of the strands currently being processed. In one embodiment, the eldest RPO calculation circuit 145 obtains the RPOs of the strands currently being processed from the respective strand documentations for the strands (e.g., stored in strand documentation buffer 120). Continuing with the example above, the eldest RPO calculation circuit 145 takes RPOs of 10, 9, and 6 as input. The eldest RPO calculation circuit 145 determines which of the inputs corresponds to the eldest undispatched instruction (e.g., which RPO is the lowest), which in this example is the RPO of 6. Thus, the eldest RPO calculation circuit 145 outputs an RPO of 6. This RPO corresponds to the RPO of the eldest undispatched instruction from among the strands currently being processed. In one embodiment, this RPO is stored in the EIP register so that it can be accessed by the RPO limit calculation circuit 155.

FIG. 6 is a diagram illustrating exemplary inputs and outputs of an RPO limit calculation circuit, according to some embodiments. The RPO limit calculation circuit 155 takes as input the RPO of the eldest undispatched instruction from among the strands currently being processed (e.g., strands 310A-C) and a delta value. In one embodiment, the RPO limit calculation circuit 155 obtains the RPO of the eldest undispatched instruction from the EIP register (e.g., which was populated by the eldest RPO calculation circuit 145 as described above). In one embodiment, the delta value is set by an ERLM instruction generated by the binary translator 110. In one embodiment, the delta value is set by hardware (e.g., by the RPO limit calculation circuit 155 itself) based on the occupancy rate of the ordering buffer 150. The RPO limit calculation circuit 155 adds the delta value to the RPO of the eldest undispatched instruction (which is 6 in this example) to obtain the RPO limit, which is provided as an output. The loop accelerator 130 may utilize the RPO limit generated by the RPO limit calculation circuit 155 to determine whether an entry for an orderable instruction can be inserted into the ordering buffer 150.

Figure 7:
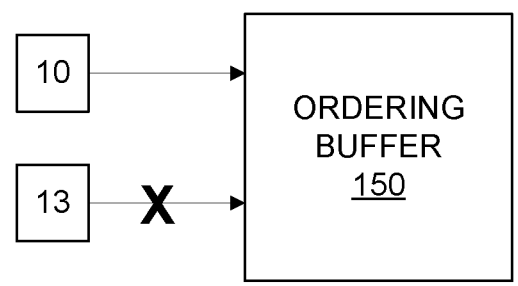
FIG. 7 is a diagram illustrating how an RPO limit is utilized to prevent entries for younger instructions from being inserted into an ordering buffer, according to some embodiments.

FIG. 7 is a diagram illustrating how an RPO limit is utilized to prevent entries for younger instructions from being inserted into an ordering buffer, according to some embodiments. Continuing with the example above, the RPO of the eldest undispatched instruction is 6. It is assumed that the delta value is set to 5 (e.g., by an ERLM instruction). Thus, the RPO limit in this example is 11 (6+5=11). The loop accelerator 130 utilizes the RPO limit to determine whether an entry for an orderable instruction is allowed to be inserted into the ordering buffer 150. For example, an entry for an orderable instruction having RPO 10 is allowed to be inserted into the ordering buffer 150 since the RPO of the orderable instruction is less than or equal to the RPO limit of 11. However, an entry for an orderable instruction having RPO 13 is not allowed to be inserted into the ordering buffer 150 since the RPO of the orderable instruction is larger than the RPO limit of 11. The entry for this orderable instruction may not be allowed to be inserted into the ordering buffer 150 until the RPO limit increases (e.g., if the eldest undispatched instruction gets dispatched and/or the delta value changes).

Figure 8:
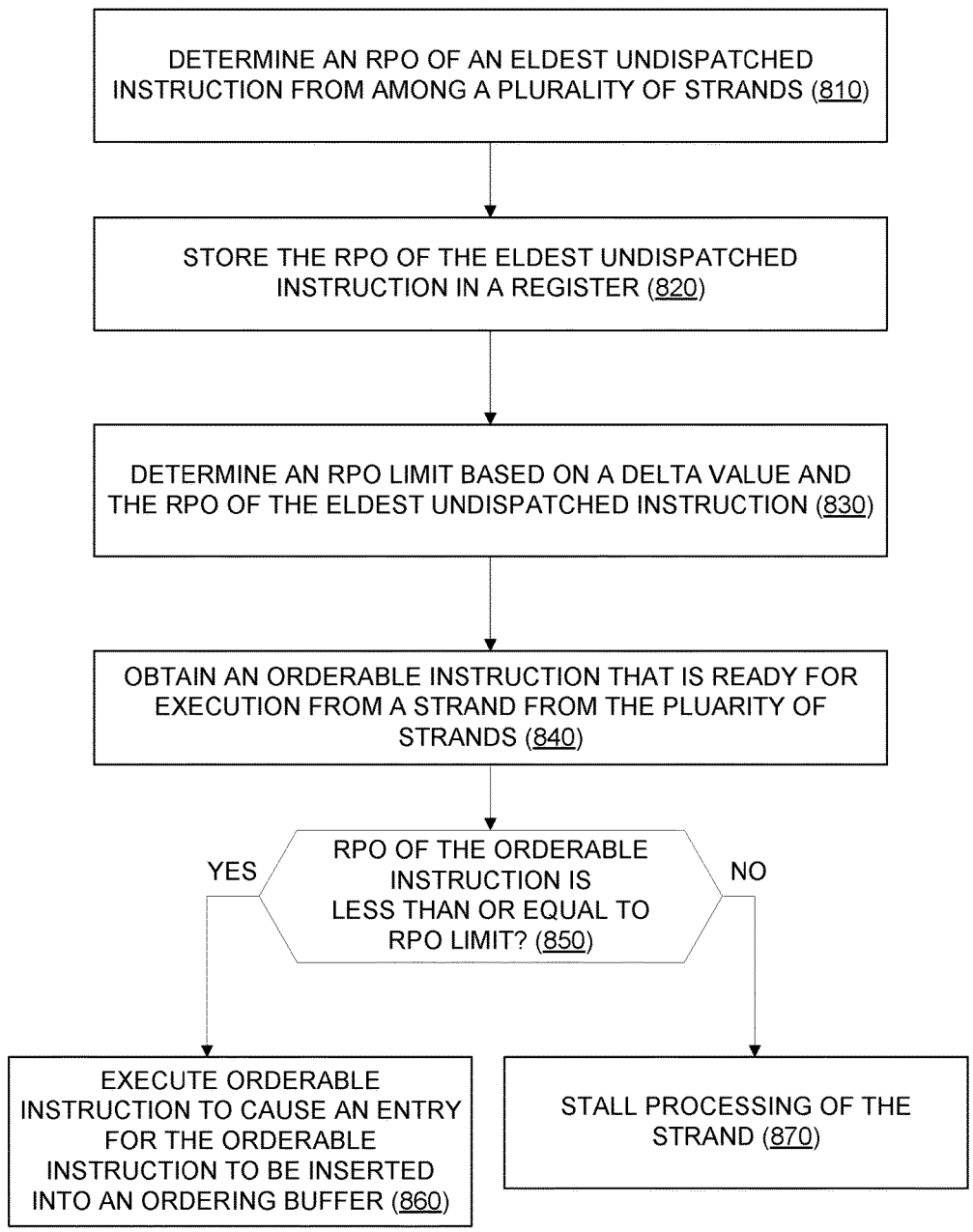
FIG. 8 is a flow diagram of a process to prioritize elder instructions over younger instructions in a system that implements a highly parallel strand-based architecture, according to some embodiments.

FIG. 8 is a flow diagram of a process to prioritize elder instructions over younger instructions in a system that implements a highly parallel strand-based architecture, according to some embodiments. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

At block 810, a first circuit (e.g., the eldest RPO calculation circuit 145) determines the RPO of the eldest undispatched (orderable) instruction from among a plurality of strands (currently being processed). In one embodiment, at block 820, the first circuit stores the RPO of the eldest undispatched instruction in a register (e.g., the EIP register). At block 830, a second circuit (e.g., the RPO limit calculation circuit 155) determines an RPO limit based on a delta value and the RPO of the eldest undispatched instruction (e.g., based on adding the delta value to the RPO of the eldest undispatched instruction stored in the register). In one embodiment, the binary translator 110 generates an ERLM instruction, where the ERLM instruction provides the delta value. The binary translator 110 may insert the ERLM instruction in the code provided to the loop accelerator 130 (e.g., in a strand) to set the delta value. In one embodiment, the second circuit adjusts the delta value based on an occupancy rate of the ordering buffer 150. For example, the second circuit may decrease the delta value in response to a determination that the occupancy rate of the ordering buffer 150 exceeds a predefined threshold rate for some time. As another example, the second circuit may increase the delta value in response to a determination that the occupancy rate of the ordering buffer 150 is below a predefined threshold rate for some time. At block 840, a third circuit (e.g., the loop accelerator 130) obtains an orderable instruction that is ready for execution from a strand from the plurality of strands. In one embodiment, the orderable instruction is a load instruction, a store instruction, or an interruptible instruction. At decision block 850, the third circuit determines whether the RPO of the orderable instruction is less than or equal to the RPO limit. If so, at block 860, the third circuit (e.g., execution circuit 135 of loop accelerator 130) executes the orderable instruction to cause an entry for the orderable instruction to be inserted into the ordering buffer 150 (where the ordering buffer 150 is to store entries for instructions that are waiting to be retired). However, if the third circuit determines that the RPO of the orderable instruction is not less than or equal to the RPO limit (the RPO is larger than the RPO limit), at block 870, the third circuit stalls processing of the strand (e.g., until the RPO limit is updated to allow the entry for the orderable instruction to be inserted into the ordering buffer 150).

In one embodiment, the ordering buffer 150 includes a plurality of buffers and the second circuit determines a separate RPO limit for each of the plurality of buffers (e.g., based on the occupancy rate of the respective buffers). In one embodiment, the ordering buffer 150 includes a load buffer, a store buffer, and/or an interruptible instruction buffer.

An advantage of embodiments disclosed herein is that they help prevent the ordering buffer 150 from being oversubscribed with younger orderable instructions so as not to impede the progress of elder orderable instructions. This allows for more opportunities for parallel execution, which improves performance. Other advantages will be apparent to one having ordinary skill in the art from the disclosure provided herein.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 9A:
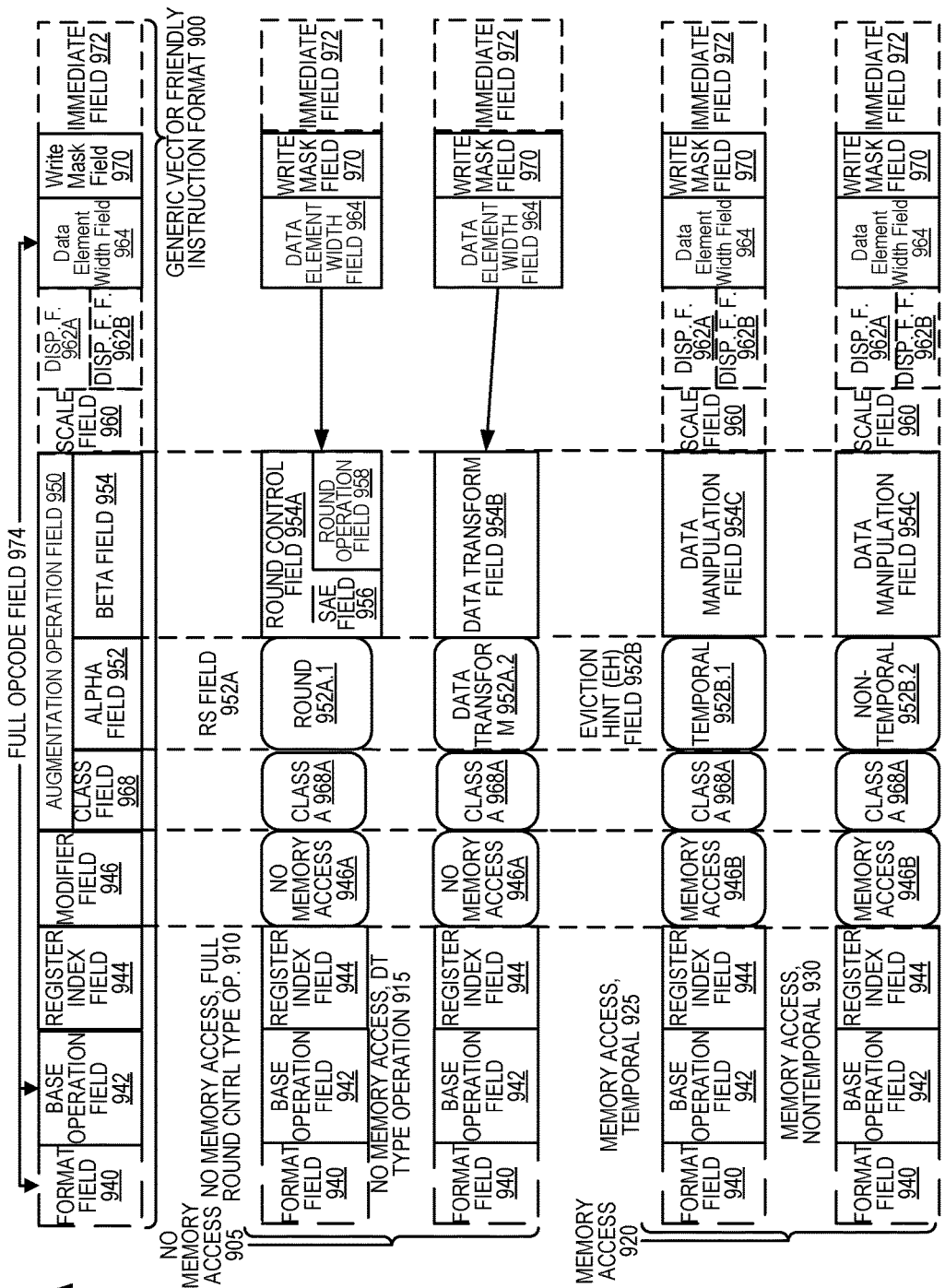
FIGS. 9A-9B are block diagrams illustrating a generic vector friendly instruction format and instruction templates thereof according to embodiments of the invention.
Figure 9B:
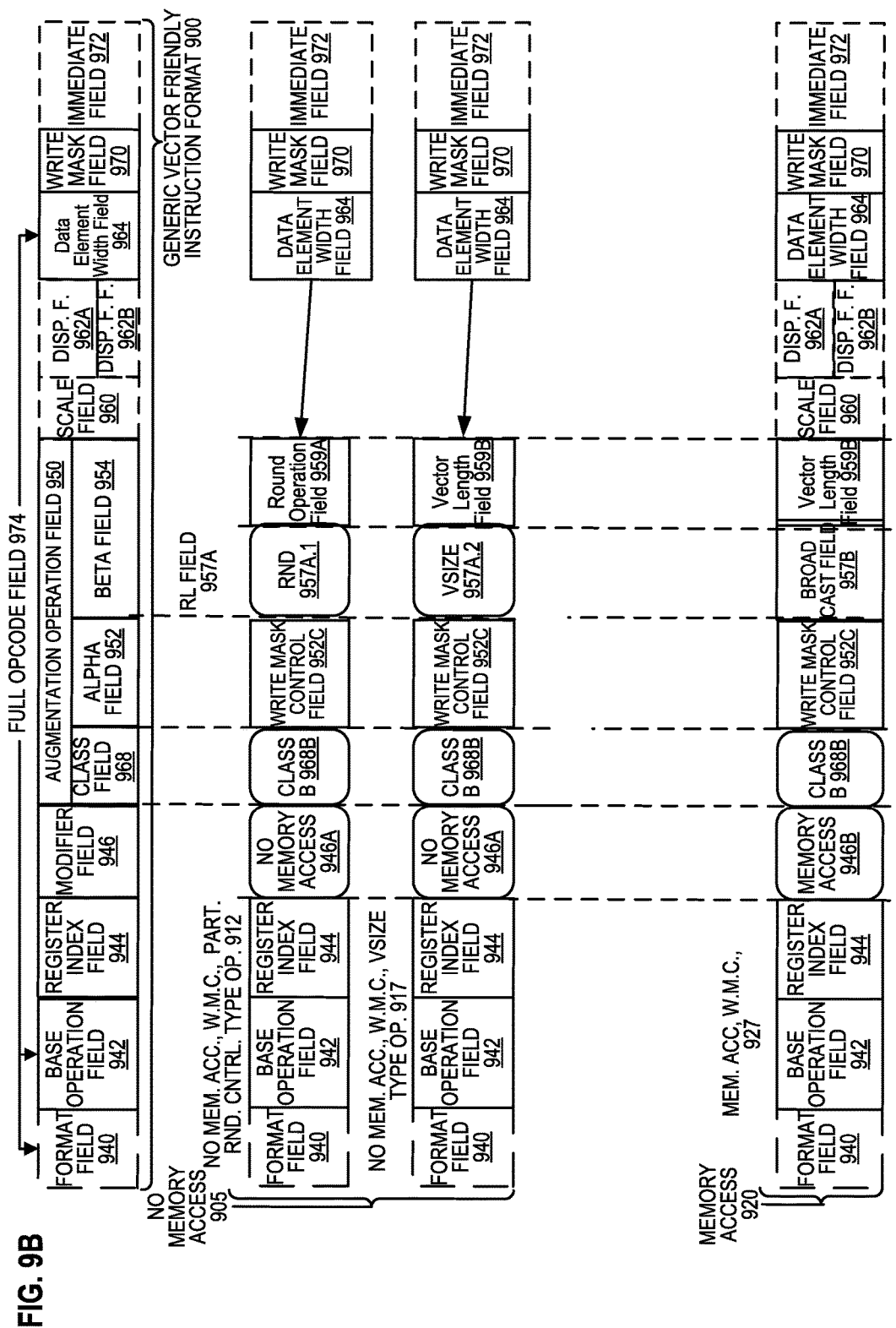

FIGS. 9A-9B are block diagrams illustrating a generic vector friendly instruction format and instruction templates thereof according to embodiments of the invention. FIG. 9A is a block diagram illustrating a generic vector friendly instruction format and class A instruction templates thereof according to embodiments of the invention; while FIG. 9B is a block diagram illustrating the generic vector friendly instruction format and class B instruction templates thereof according to embodiments of the invention. Specifically, a generic vector friendly instruction format 900 for which are defined class A and class B instruction templates, both of which include no memory access 905 instruction templates and memory access 920 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 9A include: 1) within the no memory access 905 instruction templates there is shown a no memory access, full round control type operation 910 instruction template and a no memory access, data transform type operation 915 instruction template; and 2) within the memory access 920 instruction templates there is shown a memory access, temporal 925 instruction template and a memory access, non-temporal 930 instruction template. The class B instruction templates in FIG. 9B include: 1) within the no memory access 905 instruction templates there is shown a no memory access, write mask control, partial round control type operation 912 instruction template and a no memory access, write mask control, vsize type operation 917 instruction template; and 2) within the memory access 920 instruction templates there is shown a memory access, write mask control 927 instruction template.

The generic vector friendly instruction format 900 includes the following fields listed below in the order illustrated in FIGS. 9A-9B.

Format field 940—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 942—its content distinguishes different base operations.

Register index field 944—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 946—its content distinguishes occurrences of instructions in the generic vector instruction format that specify memory access from those that do not; that is, between no memory access 905 instruction templates and memory access 920 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 950—its content distinguishes which one of a variety of different operations to be performed in addition to the base operation. This field is context specific. In one embodiment of the invention, this field is divided into a class field 968, an alpha field 952, and a beta field 954. The augmentation operation field 950 allows common groups of operations to be performed in a single instruction rather than 2, 3, or 4 instructions.

Scale field 960—its content allows for the scaling of the index field's content for memory address generation (e.g., for address generation that uses $2^{scale}*index+base$).

Displacement Field 962A—its content is used as part of memory address generation (e.g., for address generation that uses $2^{scale}*index+base+displacement$).

Displacement Factor Field 962B (note that the juxtaposition of displacement field 962A directly over displacement factor field 962B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 974 (described later herein) and the data manipulation field 954C. The displacement field 962A and the displacement factor field 962B are optional in the sense that they are not used for the no memory access 905 instruction templates and/or different embodiments may implement only one or none of the two.

Data element width field 964—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 970—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 970 allows for partial vector operations, including loads, stores, arithmetic, logical, etc. While embodiments of the invention are described in which the write mask field's 970 content selects one of a number of write mask registers that contains the write mask to be used (and thus the write mask field's 970 content indirectly identifies that masking to be performed), alternative embodiments instead or additional allow the mask write field's 970 content to directly specify the masking to be performed.

Immediate field 972—its content allows for the specification of an immediate. This field is optional in the sense that is it not present in an implementation of the generic vector friendly format that does not support immediate and it is not present in instructions that do not use an immediate.

Class field 968—its content distinguishes between different classes of instructions. With reference to FIGS. 9A-B, the contents of this field select between class A and class B instructions. In FIGS. 9A-B, rounded corner squares are used to indicate a specific value is present in a field (e.g., class A 968A and class B 968B for the class field 968 respectively in FIGS. 9A-B).

Instruction Templates of Class A

In the case of the non-memory access 905 instruction templates of class A, the alpha field 952 is interpreted as an RS field 952A, whose content distinguishes which one of the different augmentation operation types are to be performed (e.g., round 952A.1 and data transform 952A.2 are respectively specified for the no memory access, round type operation 910 and the no memory access, data transform type operation 915 instruction templates), while the beta field 954 distinguishes which of the operations of the specified type is to be performed. In the no memory access 905 instruction templates, the scale field 960, the displacement field 962A, and the displacement scale filed 962B are not present.

No-Memory Access Instruction Templates—Full Round Control Type Operation

In the no memory access full round control type operation 910 instruction template, the beta field 954 is interpreted as a round control field 954A, whose content(s) provide static rounding. While in the described embodiments of the invention the round control field 954A includes a suppress all floating point exceptions (SAE) field 956 and a round operation control field 958, alternative embodiments may support may encode both these concepts into the same field or only have one or the other of these concepts/fields (e.g., may have only the round operation control field 958).

SAE field 956—its content distinguishes whether or not to disable the exception event reporting; when the SAE field's 956 content indicates suppression is enabled, a given instruction does not report any kind of floating-point exception flag and does not raise any floating point exception handler.

Round operation control field 958—its content distinguishes which one of a group of rounding operations to perform (e.g., Round-up, Round-down, Round-towards-zero and Round-to-nearest). Thus, the round operation control field 958 allows for the changing of the rounding mode on a per instruction basis. In one embodiment of the invention where a processor includes a control register for specifying rounding modes, the round operation control field's 950 content overrides that register value.

No Memory Access Instruction Templates—Data Transform Type Operation

In the no memory access data transform type operation 915 instruction template, the beta field 954 is interpreted as a data transform field 954B, whose content distinguishes which one of a number of data transforms is to be performed (e.g., no data transform, swizzle, broadcast).

In the case of a memory access 920 instruction template of class A, the alpha field 952 is interpreted as an eviction hint field 952B, whose content distinguishes which one of the eviction hints is to be used (in FIG. 9A, temporal 952B.1 and non-temporal 952B.2 are respectively specified for the memory access, temporal 925 instruction template and the memory access, non-temporal 930 instruction template), while the beta field 954 is interpreted as a data manipulation field 954C, whose content distinguishes which one of a number of data manipulation operations (also known as primitives) is to be performed (e.g., no manipulation; broadcast; up conversion of a source; and down conversion of a destination). The memory access 920 instruction templates include the scale field 960, and optionally the displacement field 962A or the displacement scale field 962B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 952 is interpreted as a write mask control (Z) field 952C, whose content distinguishes whether the write masking controlled by the write mask field 970 should be a merging or a zeroing.

In the case of the non-memory access 905 instruction templates of class B, part of the beta field 954 is interpreted as an RL field 957A, whose content distinguishes which one of the different augmentation operation types are to be performed (e.g., round 957A.1 and vector length (VSIZE) 957A.2 are respectively specified for the no memory access, write mask control, partial round control type operation 912 instruction template and the no memory access, write mask control, VSIZE type operation 917 instruction template), while the rest of the beta field 954 distinguishes which of the operations of the specified type is to be performed. In the no memory access 905 instruction templates, the scale field 960, the displacement field 962A, and the displacement scale filed 962B are not present.

In the no memory access, write mask control, partial round control type operation 910 instruction template, the rest of the beta field 954 is interpreted as a round operation field 959A and exception event reporting is disabled (a given instruction does not report any kind of floating-point exception flag and does not raise any floating point exception handler).

Round operation control field 959A—just as round operation control field 958, its content distinguishes which one of a group of rounding operations to perform (e.g., Round-up, Round-down, Round-towards-zero and Round-to-nearest). Thus, the round operation control field 959A allows for the changing of the rounding mode on a per instruction basis. In one embodiment of the invention where a processor includes a control register for specifying rounding modes, the round operation control field's 950 content overrides that register value.

In the no memory access, write mask control, VSIZE type operation 917 instruction template, the rest of the beta field 954 is interpreted as a vector length field 959B, whose content distinguishes which one of a number of data vector lengths is to be performed on (e.g., 128, 256, or 512 byte).

In the case of a memory access 920 instruction template of class B, part of the beta field 954 is interpreted as a broadcast field 957B, whose content distinguishes whether or not the broadcast type data manipulation operation is to be performed, while the rest of the beta field 954 is interpreted the vector length field 959B. The memory access 920 instruction templates include the scale field 960, and optionally the displacement field 962A or the displacement scale field 962B.

With regard to the generic vector friendly instruction format 900, a full opcode field 974 is shown including the format field 940, the base operation field 942, and the data element width field 964. While one embodiment is shown where the full opcode field 974 includes all of these fields, the full opcode field 974 includes less than all of these fields in embodiments that do not support all of them. The full opcode field 974 provides the operation code (opcode).

The augmentation operation field 950, the data element width field 964, and the write mask field 970 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 10A is a block diagram illustrating an exemplary specific vector friendly instruction format according to embodiments of the invention. FIG. 10A shows a specific vector friendly instruction format 1000 that is specific in the sense that it specifies the location, size, interpretation, and order of the fields, as well as values for some of those fields. The specific vector friendly instruction format 1000 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 9 into which the fields from FIG. 10A map are illustrated.

It should be understood that, although embodiments of the invention are described with reference to the specific vector friendly instruction format 1000 in the context of the generic vector friendly instruction format 900 for illustrative purposes, the invention is not limited to the specific vector friendly instruction format 1000 except where claimed. For example, the generic vector friendly instruction format 900 contemplates a variety of possible sizes for the various fields, while the specific vector friendly instruction format 1000 is shown as having fields of specific sizes. By way of specific example, while the data element width field 964 is illustrated as a one bit field in the specific vector friendly instruction format 1000, the invention is not so limited (that is, the generic vector friendly instruction format 900 contemplates other sizes of the data element width field 964).

The generic vector friendly instruction format 900 includes the following fields listed below in the order illustrated in FIG. 10A.

EVEX Prefix (Bytes 0-3) 1002—is encoded in a four-byte form.

Format Field 940 (EVEX Byte 0, bits [7:0])—the first byte (EVEX Byte 0) is the format field 940 and it contains 0x62 (the unique value used for distinguishing the vector friendly instruction format in one embodiment of the invention).

The second-fourth bytes (EVEX Bytes 1-3) include a number of bit fields providing specific capability.

REX field 1005 (EVEX Byte 1, bits [7-5])—consists of a EVEX.R bit field (EVEX Byte 1, bit [7]-R), EVEX.X bit field (EVEX byte 1, bit [6]-X), and 957BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 910—this is the first part of the REX' field 910 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1015 (EVEX byte 1, bits [3:0]-mmmm)—its content encodes an implied leading opcode byte (OF, OF 38, or OF 3).

Data element width field 964 (EVEX byte 2, bit [7]-W)—is represented by the notation EVEX.W. EVEX.W is used to define the granularity (size) of the datatype (either 32-bit data elements or 64-bit data elements).

EVEX.vvvv 1020 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1020 encodes the 4 low-order bits of the first source register specifier stored in inverted (1s complement) form. Depending on the instruction, an extra different EVEX bit field is used to extend the specifier size to 32 registers.

EVEX.U 968 Class field (EVEX byte 2, bit [2]-U)—If EVEX.U=0, it indicates class A or EVEX.U0; if EVEX.0=1, it indicates class B or EVEX.U1.

Prefix encoding field 1025 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 952 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 954 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 910—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 970 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1030 (Byte 4) is also known as the opcode byte. Part of the opcode is specified in this field.

MOD R/M Field 1040 (Byte 5) includes MOD field 1042, Reg field 1044, and R/M field 1046. As previously described, the MOD field's 1042 content distinguishes between memory access and non-memory access operations. The role of Reg field 1044 can be summarized to two situations: encoding either the destination register operand or a source register operand, or be treated as an opcode extension and not used to encode any instruction operand. The role of R/M field 1046 may include the following: encoding the instruction operand that references a memory address, or encoding either the destination register operand or a source register operand.

Scale, Index, Base (SIB) Byte (Byte 6)—As previously described, the scale field's 950 content is used for memory address generation. SIB.xxx 1054 and SIB.bbb 1056—the contents of these fields have been previously referred to with regard to the register indexes Xxxx and Bbbb.

Displacement field 962A (Bytes 7-10)—when MOD field 1042 contains 10, bytes 7-10 are the displacement field 962A, and it works the same as the legacy 32-bit displacement (disp32) and works at byte granularity.

Displacement factor field 962B (Byte 7)—when MOD field 1042 contains 01, byte 7 is the displacement factor field 962B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 962B is a reinterpretation of disp8; when using displacement factor field 962B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 962B substitutes the legacy x86 instruction set 8-bit displacement. Thus, the displacement factor field 962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 972 operates as previously described.

Full Opcode Field

FIG. 10B is a block diagram illustrating the fields of the specific vector friendly instruction format 1000 that make up the full opcode field 974 according to one embodiment of the invention. Specifically, the full opcode field 974 includes the format field 940, the base operation field 942, and the data element width (W) field 964. The base operation field 942 includes the prefix encoding field 1025, the opcode map field 1015, and the real opcode field 1030.

Register Index Field

FIG. 10C is a block diagram illustrating the fields of the specific vector friendly instruction format 1000 that make up the register index field 944 according to one embodiment of the invention. Specifically, the register index field 944 includes the REX field 1005, the REX' field 1010, the MODR/M.reg field 1044, the MODR/M.r/m field 1046, the VVVV field 1020, xxx field 1054, and the bbb field 1056.

Augmentation Operation Field

Figure 10D:
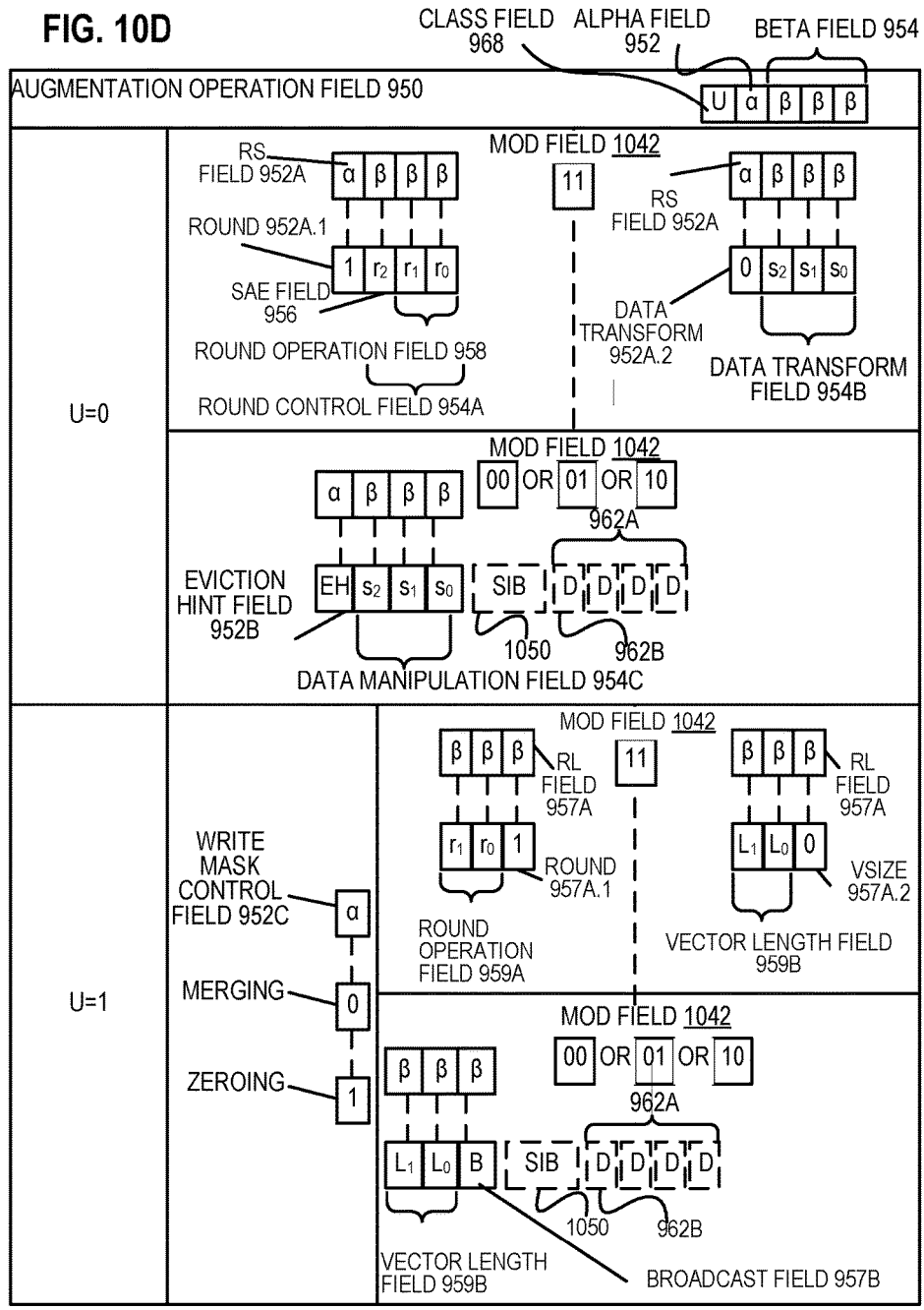
FIG. 10D is a block diagram illustrating the fields of the specific vector friendly instruction format 1000 that make up the augmentation operation field 950 according to one embodiment of the invention.

FIG. 10D is a block diagram illustrating the fields of the specific vector friendly instruction format 1000 that make up the augmentation operation field 950 according to one embodiment of the invention. When the class (U) field 968 contains 0, it signifies EVEX.U0 (class A 968A); when it contains 1, it signifies EVEX.U1 (class B 968B). When U=0 and the MOD field 1042 contains 11 (signifying a no memory access operation), the alpha field 952 (EVEX byte 3, bit [7]-EH) is interpreted as the rs field 952A. When the rs field 952A contains a 1 (round 952A.1), the beta field 954 (EVEX byte 3, bits [6:4]-SSS) is interpreted as the round control field 954A. The round control field 954A includes a one bit SAE field 956 and a two bit round operation field 958. When the rs field 952A contains a 0 (data transform 952A.2), the beta field 954 (EVEX byte 3, bits [6:4]-SSS) is interpreted as a three bit data transform field 954B. When U=0 and the MOD field 1042 contains 00, 01, or 10 (signifying a memory access operation), the alpha field 952 (EVEX byte 3, bit [7]-EH) is interpreted as the eviction hint (EH) field 952B and the beta field 954 (EVEX byte 3, bits [6:4]-SSS) is interpreted as a three bit data manipulation field 954C.

When U=1, the alpha field 952 (EVEX byte 3, bit [7]-EH) is interpreted as the write mask control (Z) field 952C. When U=1 and the MOD field 1042 contains 11 (signifying a no memory access operation), part of the beta field 954 (EVEX byte 3, bit [4]-$S_0$) is interpreted as the RL field 957A; when it contains a 1 (round 957A.1) the rest of the beta field 954 (EVEX byte 3, bit [6-5]-$S_{2-1}$) is interpreted as the round operation field 959A, while when the RL field 957A contains a 0 (VSIZE 957.A2) the rest of the beta field 954 (EVEX byte 3, bit [6-5]-$S_{2-1}$) is interpreted as the vector length field 959B (EVEX byte 3, bit [6-5]-$L_{1-0}$). When U=1 and the MOD field 1042 contains 00, 01, or 10 (signifying a memory access operation), the beta field 954 (EVEX byte 3, bits [6:4]-SSS) is interpreted as the vector length field 959B (EVEX byte 3, bit [6-5]-$L_{1-0}$) and the broadcast field 957B (EVEX byte 3, bit [4]-B).

Exemplary Register Architecture

FIG. 11 is a block diagram of a register architecture 1100 according to one embodiment of the invention. In the embodiment illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1000 operates on these overlaid register file as illustrated in the below tables.

| Adjustable Vector Length | Class | Operations | Registers |
|---|---|---|---|
| Instruction Templates that do not include the vector length field 959B | A (FIG. 9A; U = 0) | 910, 915, 925, 930 | zmm registers (the vector length is 64 byte) |
| | B (FIG. 9B; U = 1) | 912 | zmm registers (the vector length is 64 byte) |
| Instruction templates that do include the vector length field 959B | B (FIG. 9B; U = 1) | 917, 927 | zmm, ymm, or xmm registers (the vector length is 64 byte, 32 byte, or 16 byte) depending on the vector length |

In other words, the vector length field 959B selects between a maximum length and one or more other shorter lengths, where each such shorter length is half the length of the preceding length; and instructions templates without the vector length field 959B operate on the maximum vector length. Further, in one embodiment, the class B instruction templates of the specific vector friendly instruction format 1000 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1115—in the embodiment illustrated, there are 8 write mask registers (k0 through k7), each 64 bits in size. In an alternate embodiment, the write mask registers 1115 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-oforder core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 12A is a block diagram illustrating both an exemplary in-order pipeline and an exemplary register renaming, out-of-order issue/execution pipeline according to embodiments of the invention. FIG. 12B is a block diagram illustrating both an exemplary embodiment of an in-order architecture core and an exemplary register renaming, out-of-order issue/execution architecture core to be included in a processor according to embodiments of the invention. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 13A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to embodiments of the invention. In one embodiment, an instruction decoder 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the invention may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to embodiments of the invention. FIG. 13B includes an L1 data cache 1306A part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
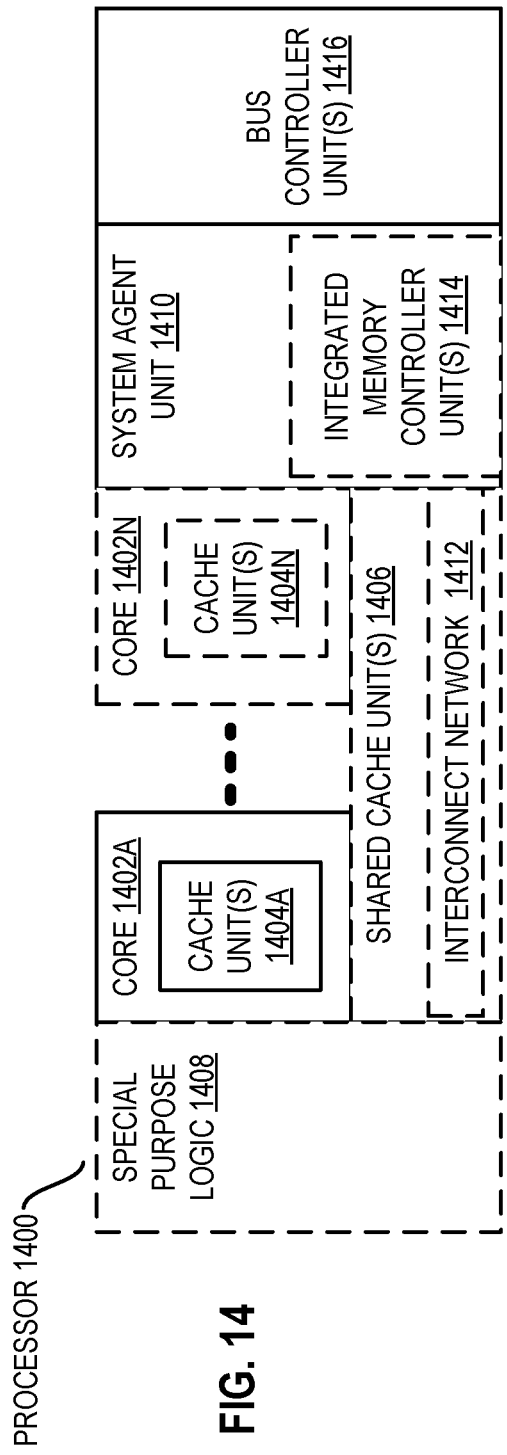
FIG. 14 is a block diagram of a processor 1400 that may have more than one core, may have an integrated memory controller, and may have integrated graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408 (integrated graphics logic 1408 is an example of and is also referred to herein as special purpose logic), the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402-A-N.

In some embodiments, one or more of the cores 1402A-N are capable of multithreading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Exemplary Computer Architectures

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
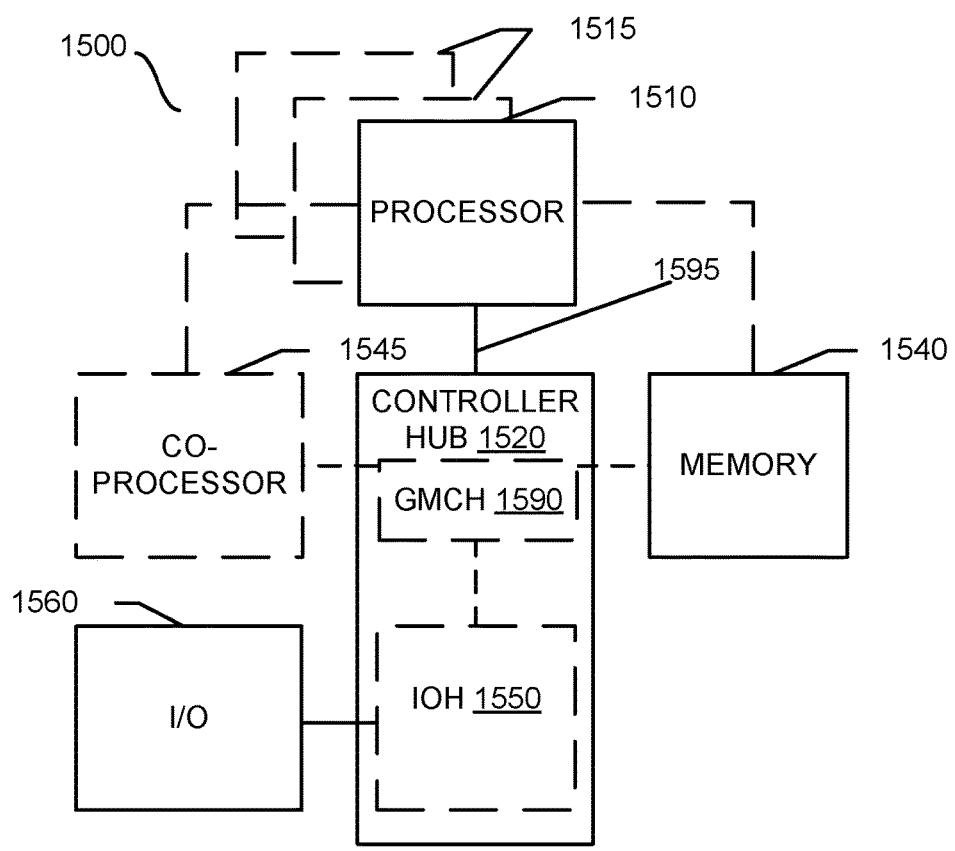
FIGS. 15-18 are block diagrams of exemplary computer architectures.

Referring now to FIG. 15, shown is a block diagram of a system 1500 in accordance with one embodiment of the present invention. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as QuickPath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor (s) 1545 accept and execute the received coprocessor instructions.

Figure 16:
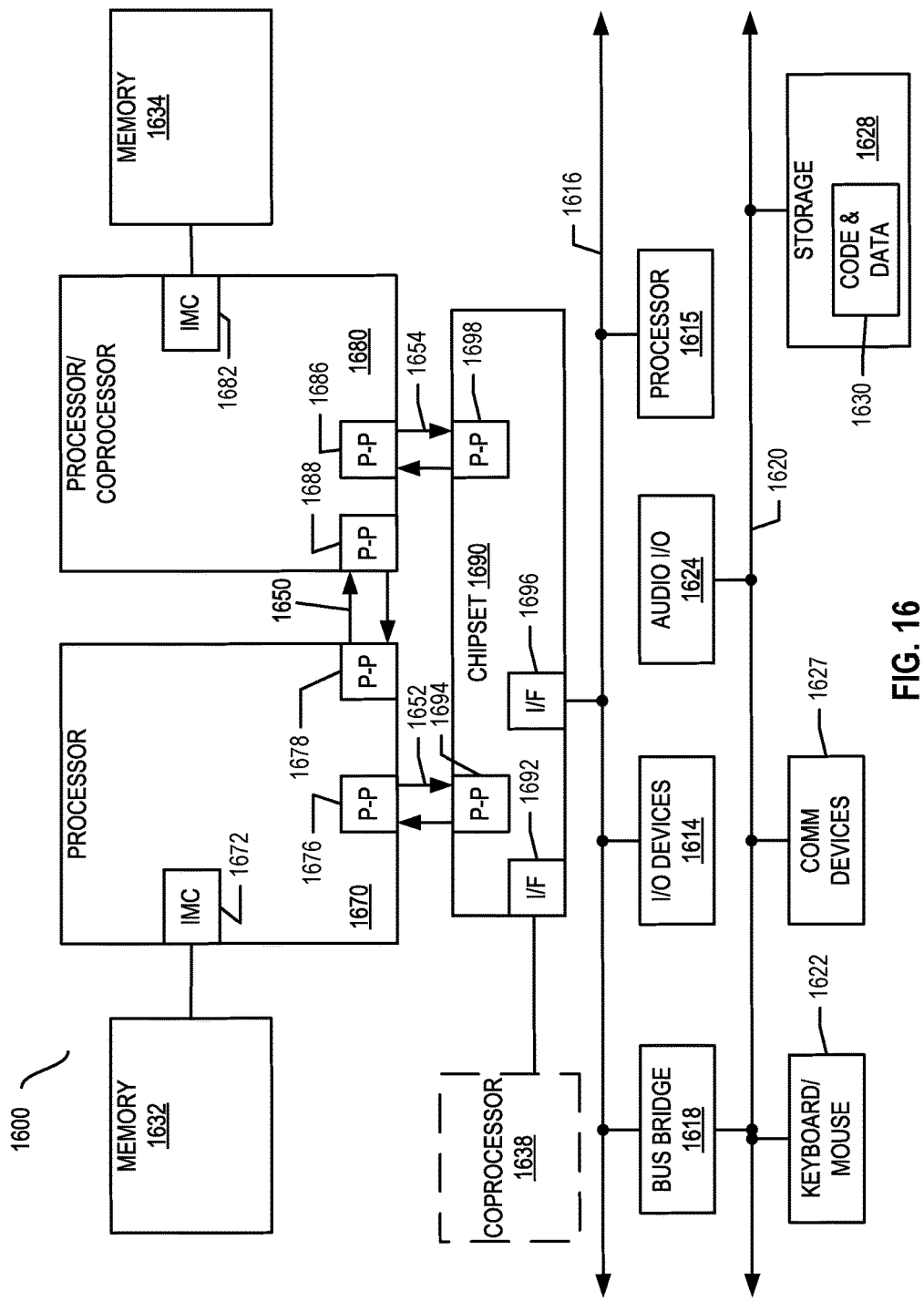

Referring now to FIG. 16, shown is a block diagram of a first more specific exemplary system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the invention, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1692. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
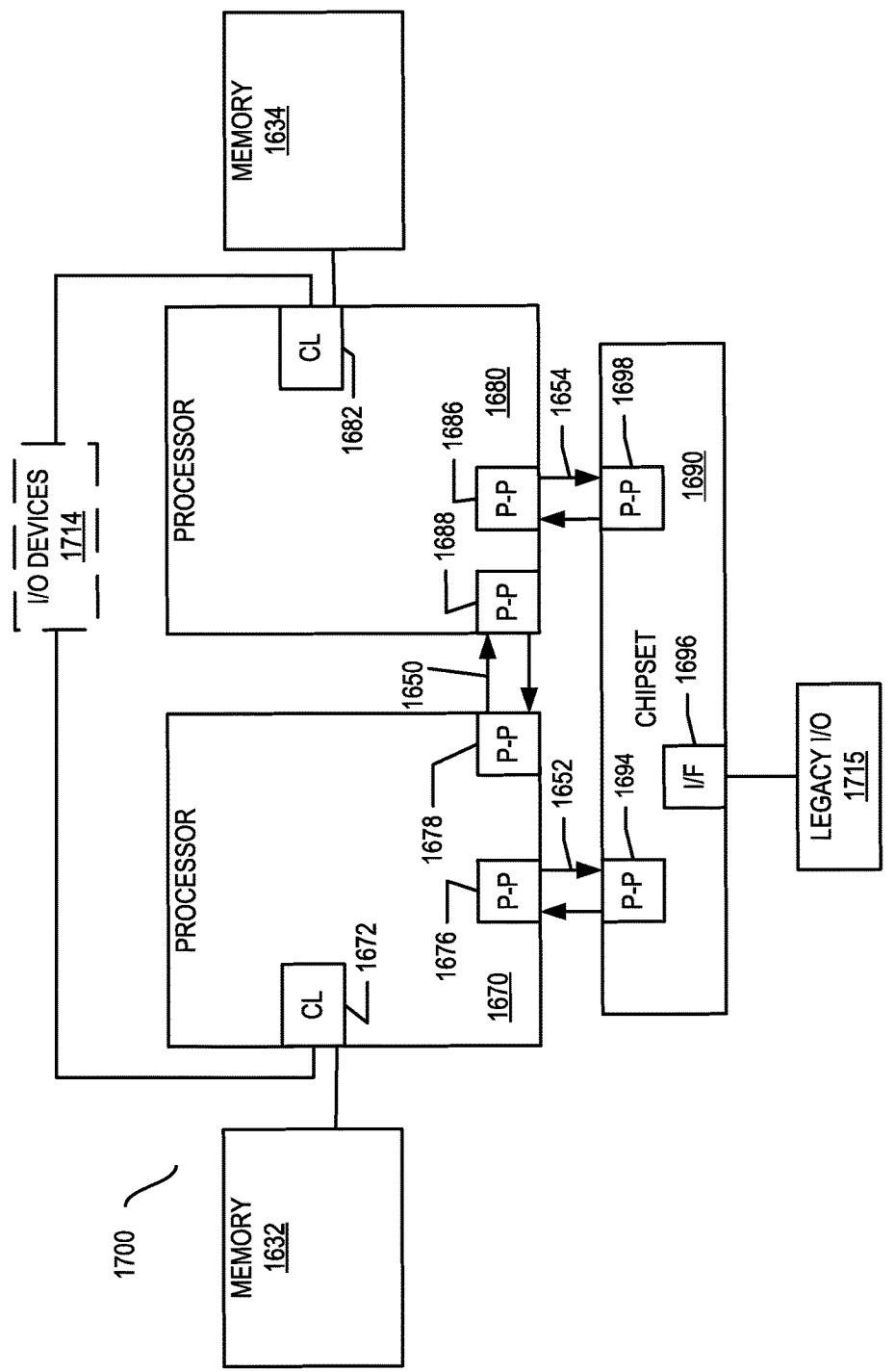

Referring now to FIG. 17, shown is a block diagram of a second more specific exemplary system 1700 in accordance with an embodiment of the present invention. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
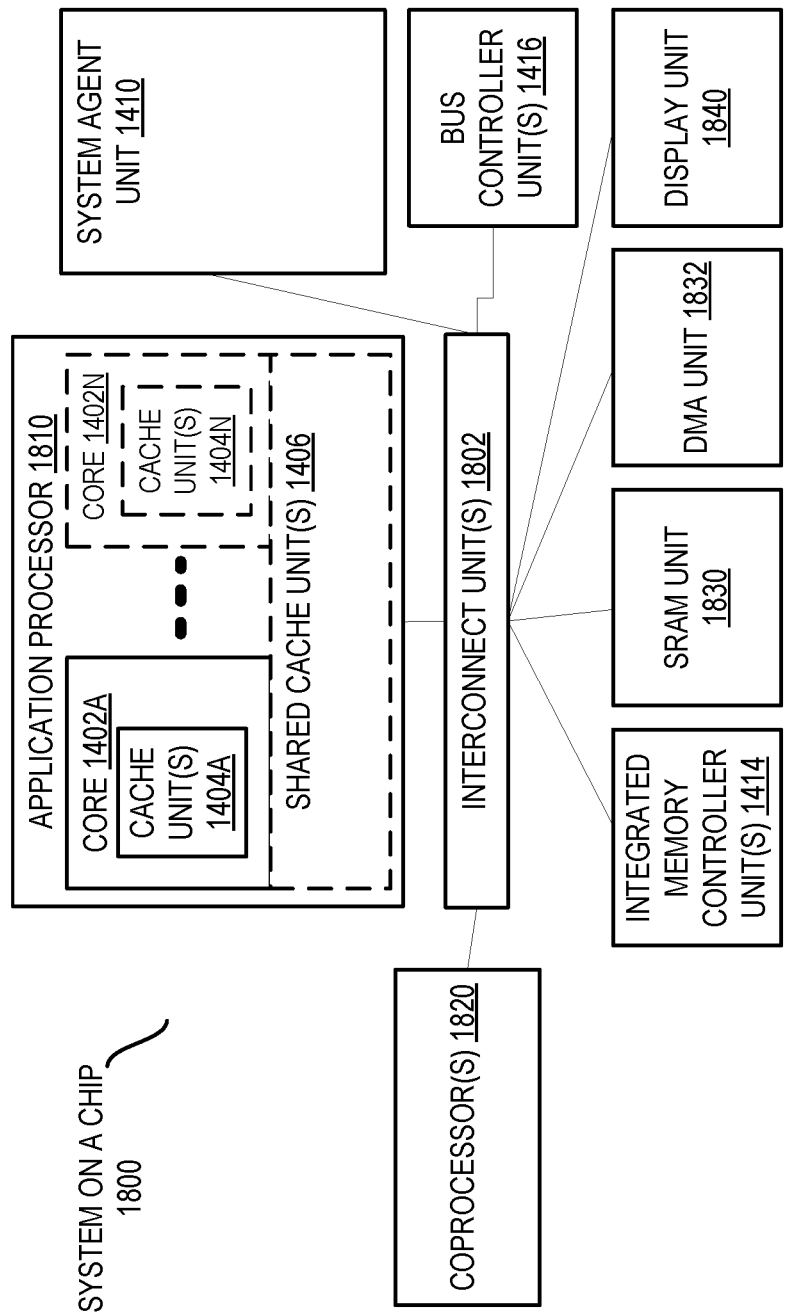

Referring now to FIG. 18, shown is a block diagram of a SoC 1800 in accordance with an embodiment of the present invention. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N, which include cache units 1404A-N, and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
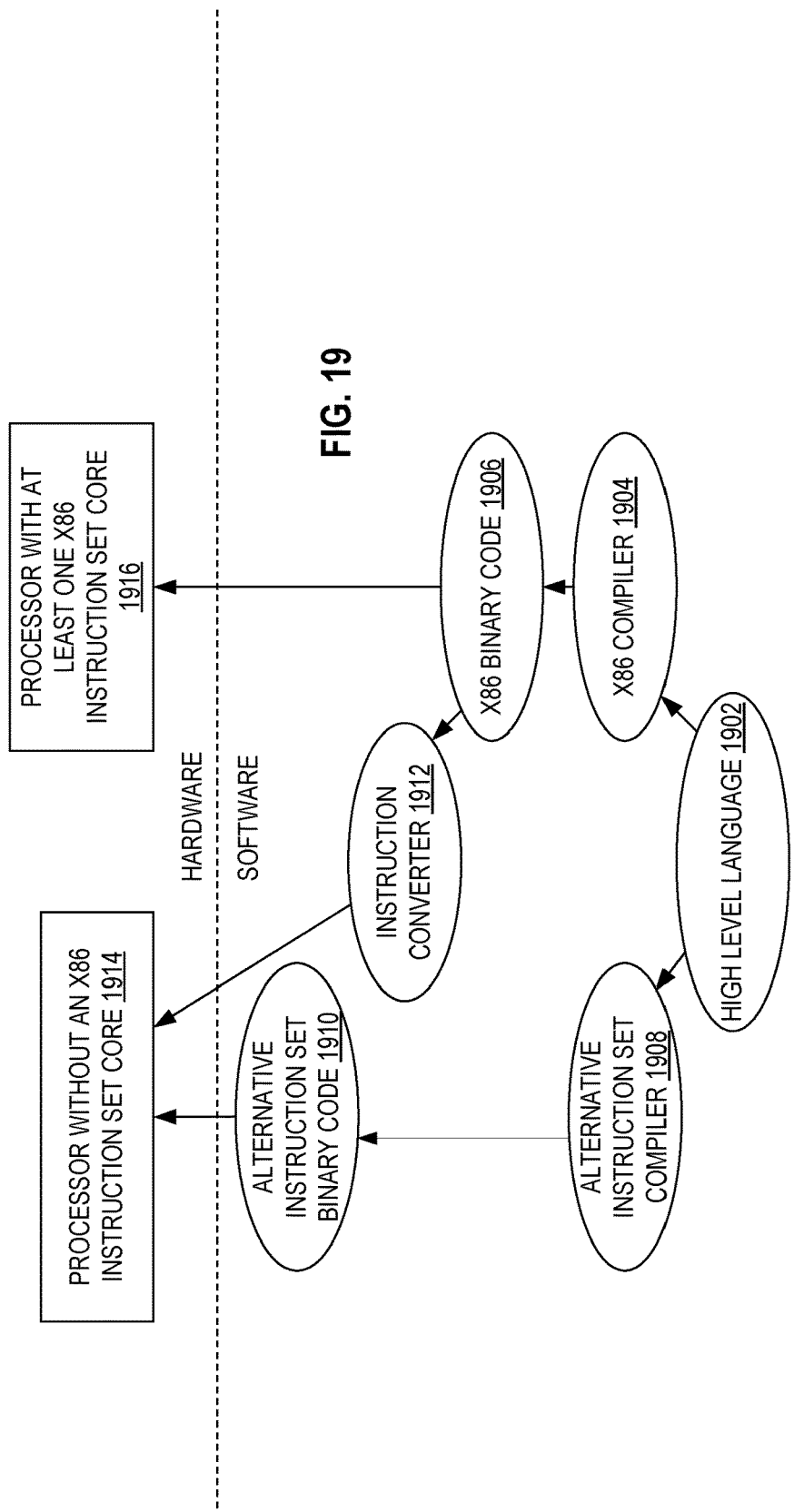
FIG. 19 is a block diagram contrasting the use of a software instruction converter to convert binary instructions in a source instruction set to binary instructions in a target instruction set according to embodiments of the invention.

FIG. 19 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

EXAMPLES

Example 1 is an apparatus. The apparatus includes a first circuit to determine an RPO of an eldest undispatched instruction from among a plurality of strands, a second circuit to determine an RPO limit based on a delta value and the RPO of the eldest undispatched instruction, an ordering buffer to store entries for instructions that are waiting to be retired, and a third circuit to execute an orderable instruction from a strand from the plurality of strands to cause an entry for the orderable instruction to be inserted into the ordering buffer in response to a determination that an RPO of the orderable instruction is less than or equal to the RPO limit.

Example 2 includes the substance of example 1. In this example, the third circuit is to stall processing of the strand in response to a determination that the RPO of the instruction is larger than the RPO limit.

Example 3 includes the substance of example 1. In this example, the apparatus further includes a binary translator to generate an ERLM instruction, where the ERLM instruction provides the delta value.

Example 4 includes the substance of example 1. In this example, the second circuit is to adjust the delta value based on an occupancy rate of the ordering buffer.

Example 5 includes the substance of example 4. In this example, adjusting the delta value includes decreasing the delta value in response to a determination that the occupancy rate of the ordering buffer exceeds a predefined threshold rate.

Example 6 includes the substance of example 1. In this example, the ordering buffer includes a plurality of buffers, and the second circuit is to determine an RPO limit for each of the plurality of buffers.

Example 7 includes the substance of example 1. In this example, the ordering buffer includes any one of a load buffer, a store buffer, and an interruptible instruction buffer.

Example 8 includes the substance of example 1. In this example, the orderable instruction is any one of a load instruction, a store instruction, and an interruptible instruction.

Example 9 includes the substance of example 1. In this example, the first circuit is to store the RPO of the eldest undispatched instruction in a register.

Example 10 is a method. The method includes determining an RPO of an eldest undispatched instruction from among a plurality of strands, determining an RPO limit based on a delta value and the RPO of the eldest undispatched instruction, and executing an orderable instruction from a strand from the plurality of strands to cause an entry for the orderable instruction to be inserted into an ordering buffer in response to a determination that an RPO of the orderable instruction is less than or equal to the RPO limit, where the ordering buffer stores entries for instructions that are waiting to be retired.

Example 11 includes the substance of example 10. In this example, the method further includes stalling processing of the strand in response to a determination that the RPO of the instruction is larger than the RPO limit.

Example 12 includes the substance of example 10. In this example, the method further includes generating an ERLM instruction, where the ERLM instruction provides the delta value.

Example 13 includes the substance of example 10. In this example, the method further includes adjusting the delta value based on an occupancy rate of the ordering buffer.

Example 14 includes the substance of example 13. In this example, adjusting the delta value includes decreasing the delta value in response to a determination that the occupancy rate of the ordering buffer exceeds a predefined threshold rate.

Example 15 includes the substance of example 10. In this example, the ordering buffer includes a plurality of buffers and the method further includes determining an RPO limit for each of the plurality of buffers.

Example 16 includes the substance of example 10. In this example, the ordering buffer includes any one of a load buffer, a store buffer, and an interruptible instruction buffer.

Example 17 includes the substance of example 10. In this example, the orderable instruction is any one of a load instruction, a store instruction, and an interruptible instruction.

Example 18 includes the substance of example 10. In this example, the method further includes storing the RPO of the eldest undispatched instruction in a register.

Example 19 is a system. The system includes a first circuit to determine an RPO of an eldest undispatched instruction from among a plurality of strands, a binary translator to generate an ERLM instruction, where the ERLM instruction provides a delta value, a second circuit to determine an RPO limit based on the delta value provided by the ERLM instruction and the RPO of the eldest undispatched instruction, an ordering buffer to store entries for instructions that are waiting to be retired, and a third circuit to execute an orderable instruction from a strand from the plurality of strands to cause an entry for the orderable instruction to be inserted into the ordering buffer in response to a determination that an RPO of the orderable instruction is less than or equal to the RPO limit.

Example 20 includes the substance of example 19. In this example, the third circuit is to stall processing of the strand in response to a determination that the RPO of the instruction is larger than the RPO limit.

Example 21 includes the substance of example 19. In this example, the third circuit is to execute the ERLM instruction to set the delta value.

Example 22 includes the substance of example 19. In this example, the second circuit is to adjust the delta value based on an occupancy rate of the ordering buffer.

Example 23 includes the substance of example 22. In this example, adjusting the delta value includes decreasing the delta value in response to a determination that the occupancy rate of the ordering buffer exceeds a predefined threshold rate.

Example 24 includes the substance of example 19. In this example, the ordering buffer includes a plurality of buffers and the second circuit is to determine an RPO limit for each of the plurality of buffers.

Example 25 includes the substance of example 19. In this example, the ordering buffer includes any one of a load buffer, a store buffer, and an interruptible instruction buffer.

Example 26 includes the substance of example 19. In this example, the orderable instruction is any one of a load instruction, a store instruction, and an interruptible instruction.

Example 27 includes the substance of example 19. In this example, the first circuit is to store the RPO of the eldest undispatched instruction in a register.

Example 28 is an apparatus. The apparatus includes a first means to determine an RPO of an eldest undispatched instruction from among a plurality of strands, a second means to determine an RPO limit based on a delta value and the RPO of the eldest undispatched instruction, an ordering buffer to store entries for instructions that are waiting to be retired, and a third means to execute an orderable instruction from a strand from the plurality of strands to cause an entry for the orderable instruction to be inserted into the ordering buffer in response to a determination that an RPO of the orderable instruction is less than or equal to the RPO limit.

Example 29 includes the substance of example 28. In this example, the third means is to stall processing of the strand in response to a determination that the RPO of the instruction is larger than the RPO limit.

Example 30 includes the substance of example 28. In this example, the apparatus further includes a fourth means to generate an ERLM instruction, where the ERLM instruction provides the delta value.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:
   determining a real program order (RPO) of an eldest undispatched instruction from among a plurality of strands;
   determining an RPO limit based on a delta value and the RPO of the eldest undispatched instruction; and
   executing an orderable instruction from a strand from the plurality of strands to cause an entry for the orderable instruction to be inserted into an ordering buffer in response to a determination that an RPO of the orderable instruction is less than or equal to the RPO limit, wherein the ordering buffer to store entries for instructions that are waiting to be retired.

2. The method of claim 1, further comprising:
   stalling processing of the strand in response to a determination that the RPO of the instruction is larger than the RPO limit.

3. The method of claim 1, further comprising:
   generating an execution RPO limit management (ERLM) instruction, wherein the ERLM instruction provides the delta value.

4. The method of claim 1, further comprising:
   adjusting the delta value based on an occupancy rate of the ordering buffer.

5. The method of claim 4, wherein adjusting the delta value includes decreasing the delta value in response to a determination that the occupancy rate of the ordering buffer exceeds a predefined threshold rate.

6. The method of claim 1, wherein the ordering buffer includes a plurality of buffers, and wherein the method further comprises:
   determining an RPO limit for each of the plurality of buffers.

7. An apparatus comprising:
   a first circuit to determine a real program order (RPO) of an eldest undispatched instruction from among a plurality of strands;
   a second circuit to determine an RPO limit based on a delta value and the RPO of the eldest undispatched instruction;
   an ordering buffer to store entries for instructions that are waiting to be retired; and
   a third circuit to execute an orderable instruction from a strand from the plurality of strands to cause an entry for the orderable instruction to be inserted into the ordering buffer in response to a determination that an RPO of the orderable instruction is less than or equal to the RPO limit.

8. The apparatus of claim 7, wherein the third circuit is to stall processing of the strand in response to a determination that the RPO of the instruction is larger than the RPO limit.

9. The apparatus of claim 7, further comprising:
   a binary translator to generate an execution RPO limit management (ERLM) instruction, wherein the ERLM instruction provides the delta value.

10. The apparatus of claim 7, wherein the second circuit is to adjust the delta value based on an occupancy rate of the ordering buffer.

11. The apparatus of claim 10, wherein adjusting the delta value includes decreasing the delta value in response to a determination that the occupancy rate of the ordering buffer exceeds a predefined threshold rate.

12. The apparatus of claim 7, wherein the ordering buffer includes a plurality of buffers, and wherein the second circuit is to determine an RPO limit for each of the plurality of buffers.

13. The apparatus of claim 7, wherein the ordering buffer includes any one of a load buffer, a store buffer, and an interruptible instruction buffer.

14. The apparatus of claim 7, wherein the orderable instruction is any one of a load instruction, a store instruction, and an interruptible instruction.

15. The apparatus of claim 7, wherein the first circuit is to store the RPO of the eldest undispatched instruction in a register.

16. A system comprising:
- a first circuit to determine a real program order (RPO) of an eldest undispatched instruction from among a plurality of strands;
- a binary translator to generate an execution RPO limit management (ERLM) instruction, wherein the ERLM instruction provides a delta value;
- a second circuit to determine an RPO limit based on the delta value provided by the ERLM instruction and the RPO of the eldest undispatched instruction;
- an ordering buffer to store entries for instructions that are waiting to be retired; and
- a third circuit to execute an orderable instruction from a strand from the plurality of strands to cause an entry for the orderable instruction to be inserted into the ordering buffer in response to a determination that an RPO of the orderable instruction is less than or equal to the RPO limit.

17. The system of claim 16, wherein the third circuit is to stall processing of the strand in response to a determination that the RPO of the instruction is larger than the RPO limit.

18. The system of claim 16, wherein the third circuit is to execute the ERLM instruction to set the delta value.

19. The system of claim 16, wherein the second circuit is to adjust the delta value based on an occupancy rate of the ordering buffer.

20. The system of claim 19, wherein adjusting the delta value includes decreasing the delta value in response to a determination that the occupancy rate of the ordering buffer exceeds a predefined threshold rate.

* * * * *